United States Patent
Asahi

(10) Patent No.: US 8,098,313 B2
(45) Date of Patent: Jan. 17, 2012

(54) ADDRESS GENERATOR AND IMAGE CAPTURING DEVICE

(75) Inventor: Tsunemori Asahi, Azumino (JP)

(73) Assignee: Seiko Epson Corporation (JP)

( * ) Notice: Subject to any disclaimer, the term of this patent is extended or adjusted under 35 U.S.C. 154(b) by 915 days.

(21) Appl. No.: 12/121,971

(22) Filed: May 16, 2008

(65) Prior Publication Data

US 2008/0284883 A1    Nov. 20, 2008

(30) Foreign Application Priority Data

May 18, 2007    (JP) ................................ 2007-132649

(51) Int. Cl.
*H04N 5/335* (2006.01)

(52) U.S. Cl. ...................................... 348/308; 348/296

(58) Field of Classification Search .......... 348/294–297, 348/302–310
See application file for complete search history.

(56) References Cited

U.S. PATENT DOCUMENTS

| 7,331,523 B2* | 2/2008 | Meier et al. ............... 235/462.25 |
| 7,541,571 B2* | 6/2009 | Lee ............................ 250/214.1 |
| 2002/0089597 A1* | 7/2002 | Pearson ........................ 348/308 |

FOREIGN PATENT DOCUMENTS

| JP | 2001-238138 | 8/2001 |
| JP | 2003-198948 | 7/2003 |
| JP | 2006-148621 | 6/2006 |
| JP | 2007-19498 | 1/2007 |

* cited by examiner

*Primary Examiner* — Darryl J Collins

(74) *Attorney, Agent, or Firm* — Harness, Dickey & Pierce, P.L.C.

(57) ABSTRACT

An address generator that generates, in an image capturing device including a photoelectric conversion unit having arrayed therein in a matrix plural photoelectric conversion elements that convert received light into charges and accumulate the charges and a rolling shutter function, an address indicating a line position of each of the photoelectric conversion elements that are processing objects of readout processing and reset processing for accumulated charges includes address counters provided at least in a number same as a number of time divisions of the readout processing and the reset processing, a control unit that independently controls an operation of each of the address counters, a selecting circuit that sequentially selects each of the address counters in a time division manner and outputs a count value of the selected address counter to an address decode circuit as the address, and the address decode circuit that outputs a signal for changing the photoelectric conversion element in a line position corresponding to the address inputted from the selection circuit in a time division manner to an active state.

12 Claims, 12 Drawing Sheets

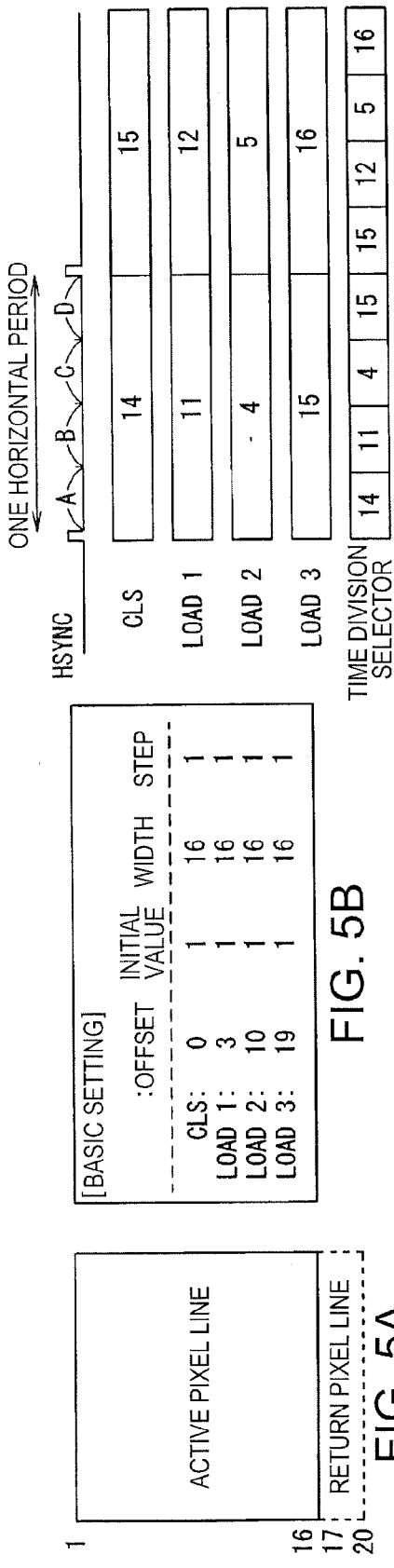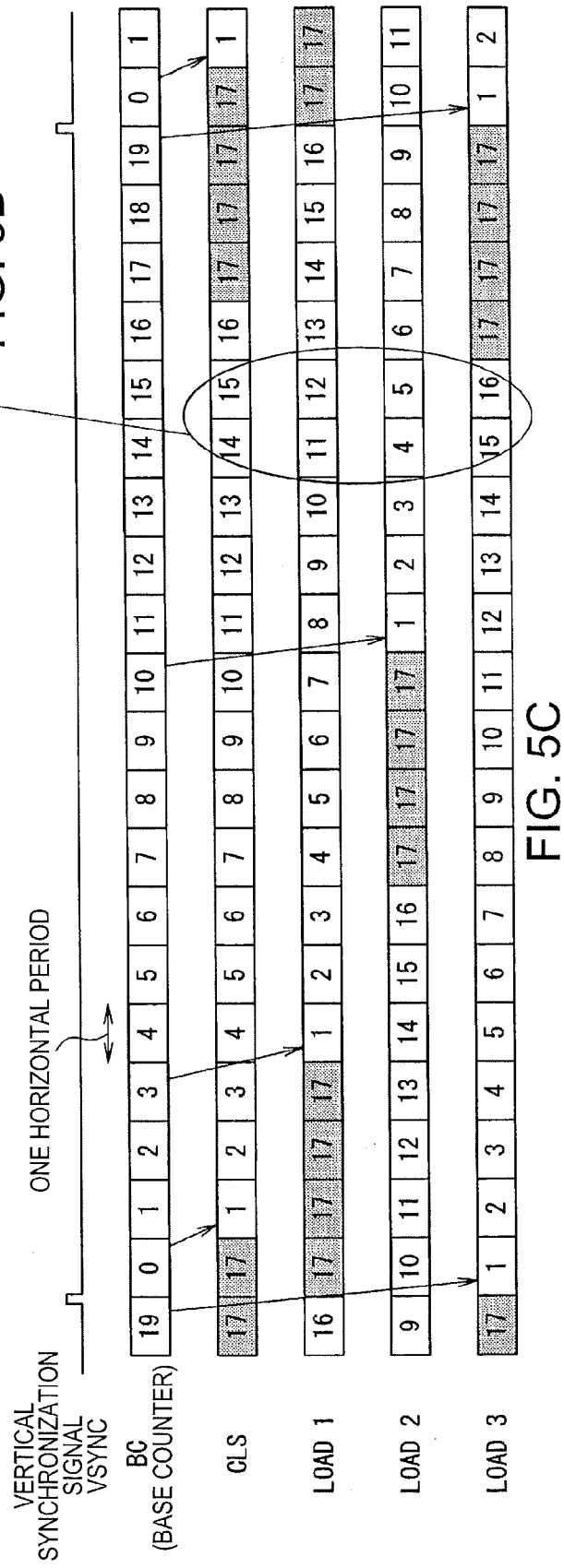
FIG. 5A
FIG. 5B
FIG. 5C
FIG. 5D

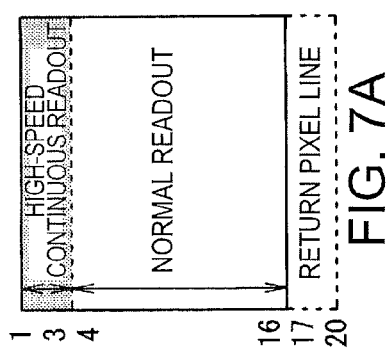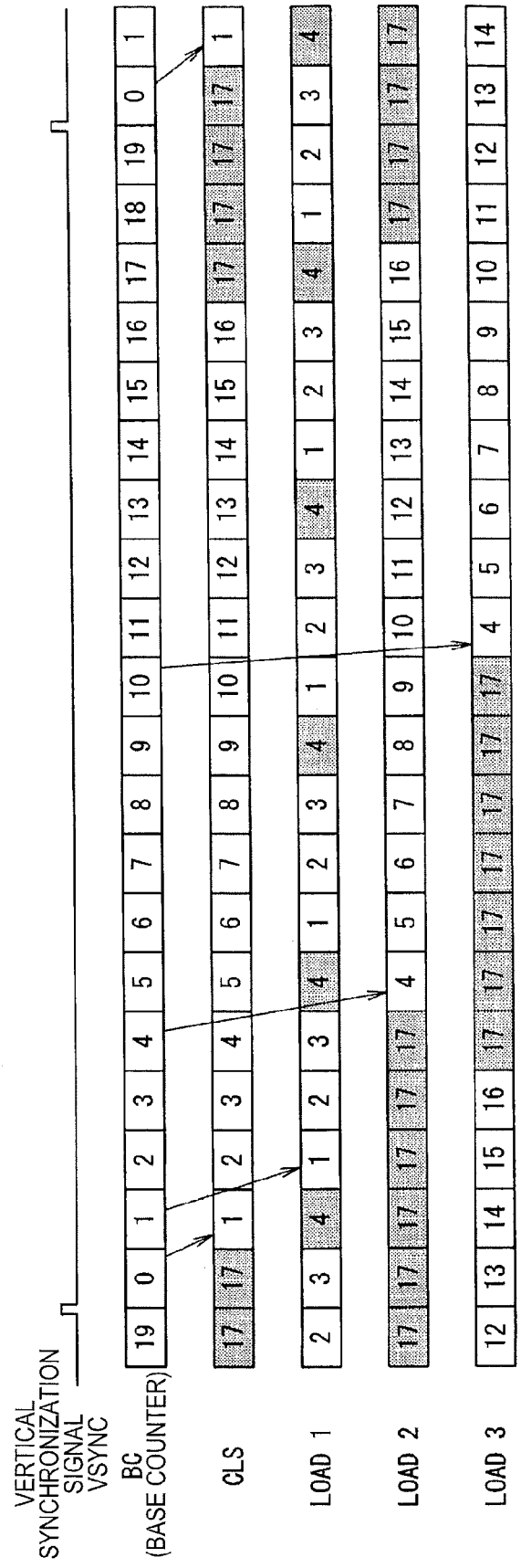
FIG. 7A
FIG. 7B
FIG. 7C

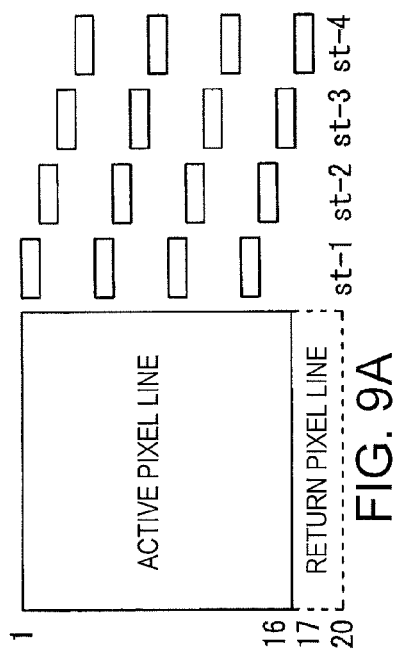
FIG. 9A
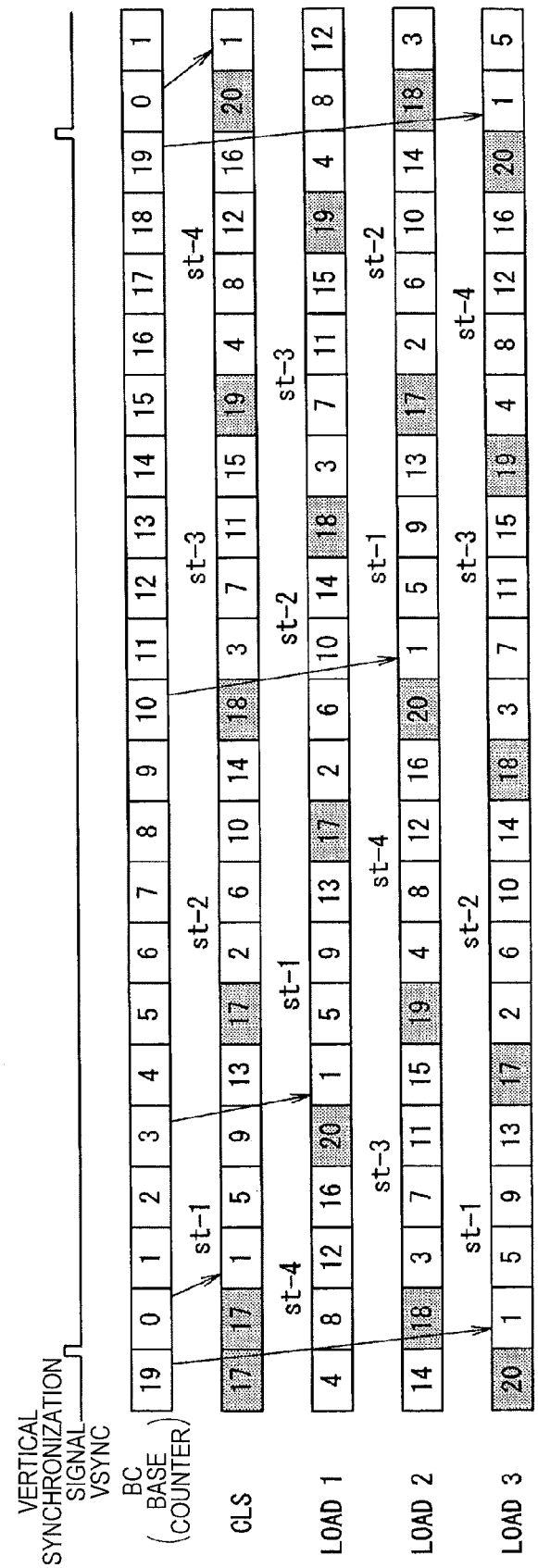
FIG. 9B
FIG. 9C

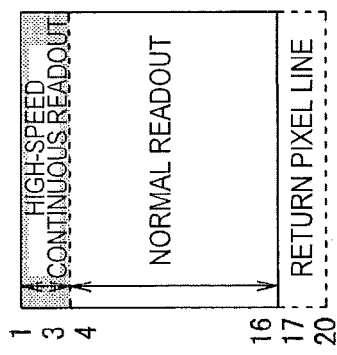
FIG.12A
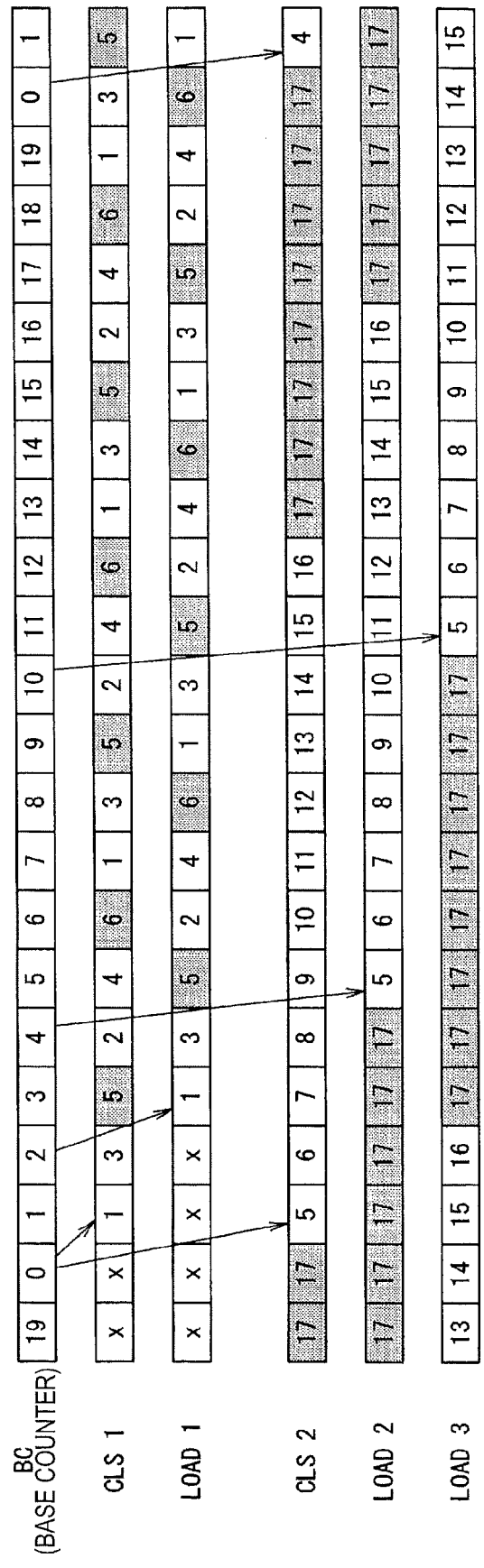
FIG.12B
FIG.12C

ADDRESS GENERATOR AND IMAGE CAPTURING DEVICE

BACKGROUND

1. Technical Field

The present invention relates to an address generator that generates addresses indicating line positions of a photoelectric conversion element, which are objects of readout processing or reset processing for accumulated charges in an image capturing device, and an image capturing device including the address generator.

2. Related Art

As solid-state imaging devices, there are an image sensor of a CCD (Charge Coupled Device) type (hereinafter referred to as CCD sensor) and an image sensor of a CMOS type (hereinafter referred to as CMOS sensor). There is also proposed a MOS solid-state imaging device of a threshold voltage modulation system (hereinafter referred to as substrate modulation type sensor) that realizes both a high image quality and low power consumption. The CMOS sensor and the substrate modulation type sensor (hereinafter referred to as CMOS sensor and the like) have been actively developed in recent years because of advantages such as power consumption and process cost lower than those of the CCD sensor.

The CMOS sensor and the like have a rolling shutter mode for performing processing line by line in reading out charges accumulated in a photodiode serving as a photoelectric conversion element and resetting the charges accumulated in the photodiode.

As techniques employing the rolling shutter mode, for example, JP-A-2003-198948 discloses a solid-state imaging device and JP-A-2001-238138 discloses a timing generator for a solid-state imaging device.

In the solid-state imaging device disclosed in JP-A-2003-198948, V selecting means operates on the basis of a timing pulse from a timing generator, selects a row of a pixel unit, and outputs an address pulse (high level) to pixels belonging to the selected row at timing T1. The address pulse is supplied to address gates in the respective pixels and, as a result, the address gates are turned on, and amplifying transistors are connected to a vertical signal line. The V selecting means outputs a reset pulse at timing T2, whereby reset gates are turned on, FDs (photodiode) units are connected to a power supply Vdd, and charges (electrons) accumulated in the FD units are rejected. The V selecting means selects a select row, a first shutter row, and a second shutter row and drives pixel wirings corresponding thereto. For example, with five-hundred rows set from the first shutter row to the second shutter row and five rows set from the second shutter row to the select row, the V selecting means combines a high-luminance output signal and a low-luminance output signal outputted from an output unit to create a wide-dynamic range image.

The timing generator for the solid-state imaging device disclosed in JP-A-2001-238138 includes V and H counters that execute count operations with pulses of respective vertical synchronization signals VD and horizontal synchronization signals HD as triggers, a ROM for storing time series data representing a repetition pattern at a logical level of an output pulse, a ROM for storing edge data indicating at which count values of the V and H counters a logical level of a control pulse should transition, V and H comparators for transitioning the logical level of the control pulse at a point when the count values of the V and H counters coincide with the edge data and outputting, as a timing pulse, a result of a logical operation of the output pulse based on the time series data and the control pulse, and a combination logic circuit. The timing generator makes it possible to realize thinning-out readout according processing for setting the counter values of the V and H counters or values obtained by subtraction processing as addresses on a selected line and adding an arbitrary value to the count values of the counters. The timing generator adopts the rolling shutter system for switching a scroll direction by switching use and nonuse of a subtraction circuit.

However, in the related art disclosed in JP-A-2003-198948, the rolling shutter system for selecting rows of the FD units, from which chargers are read out, while shifting the rows one by one using a shift register is used. Therefore, it is impossible to control special readout timing for quickly reading out charges from the FD units of a part of rows of the pixel units or reading out charges while skipping arbitrary several rows.

In the related art disclosed in JP-A-2001-238138, reset timing is not taken into account at all with respect to readout timing. Therefore, when the thinning-out readout is performed, it is likely that images with gradually changing exposure time are read out on an upper side and a lower side of a readout image. In the thinning-out readout, since specific pixels are repeatedly subjected to readout processing, it is impossible to realize interlace readout for reading out an entire screen row by row in a double data rate frame.

SUMMARY

An advantage of some aspect of the invention is to provide an address generator and an image capturing device suitable for performing flexible control of readout timing and reset timing for accumulated charges in an image capturing device of a rolling shutter system.

According to an aspect of the invention, there is provided an address generator that generates, in an image capturing device including a photoelectric conversion unit having arrayed therein in a matrix plural photoelectric conversion elements that convert received light into charges and accumulate the charges and a rolling shutter function, an address indicating a line position of each of the photoelectric conversion elements that are processing objects of readout processing and reset processing for accumulated charges. The address generator includes address counters provided at least in a number same as a number of time divisions of the readout processing and the reset processing, a control unit that independently controls an operation of each of the address counters, a selecting circuit that sequentially selects each of the address counters in a time division manner and outputs a count value of the selected address counter to an address decode circuit as the address, and the address decode circuit that outputs a signal for changing the photoelectric conversion element in a line position corresponding to the address inputted from the selection circuit in a time division manner to an active state.

With such a configuration, when the readout processing and the reset processing are performed in a time division manner, count operations of the address counters provided at least in the number same as the number of time divisions are controlled independently from one another. Therefore, it is possible to generate appropriate addresses and decode the generated addresses at appropriate timing.

For example, it is possible to time-divide each of horizontal periods, control count operations of the address counters independently from one another, generate, in a time division manner, an address that can cause an image capturing device to perform N kinds of readout processing and reset processing in each of the horizontal periods, and decode the generated address in a time division manner. Consequently, there is an effect that it is possible to cause the image capturing device to execute various kinds of readout processing, for example, cause the image capturing device to quickly read out charges from a part of photoelectric conversion elements of the photoelectric conversion unit, read out charges while skipping arbitrary several rows, and perform interlace readout.

The address counters for the readout processing and the address counters for the reset processing can be controlled independently from each other. Therefore, there is also an effect that it is possible to accurately control readout timing and reset timing.

It is preferable that, in the address generator, the address generator further includes a control-information acquiring unit that acquires control information for controlling each of the address counters, and the control unit controls the address counters independently from one another on the basis of the control information acquired by the control-information acquiring unit.

With such a configuration, there is an effect that it is possible to easily cause, using the control information, each of the address counters to perform an arbitrary count operation.

It is preferable that, in the address generator, the image capturing device performs the readout processing and the reset processing in each of the horizontal periods in a time division manner, the address generator includes a reference counter that performs a count operation on the basis of a counter update clock generated on the basis of a horizontal synchronization signal, the control information includes an offset value of each of the address counters, and the control unit causes, when the offset value and a count value of the reference counter coincide with each other, each of the address counters to start a count operation with timing of the coincidence as a trigger.

With such a configuration, for example, it is possible to control start timing of the count operation of each of the address counters with respect to the count value of the reference counter that performs the count operation with the horizontal synchronization signal or a signal obtained by re-sampling the horizontal synchronization signal using an internal operation clock as a trigger. Therefor, there is an effect that it is possible to easily perform management of exposure time for various kinds of readout processing performed in each of the horizontal periods in a time division manner.

It is preferable that, in the address generator, the control information includes a step value of each of the address counters, and the control unit sets a step width at the time of the count operation of each of the address counters and causes each of the address counters to perform counting at the set step width.

With such a configuration, it is possible to cause each of the address counters to perform counting at the step width set according to the step value included in the control information. Therefore, it is possible to cause each of the address counters to perform counting at a desired step width by preparing the control information such that a desired step value is set. Consequently, since it is possible to cause the image capturing device to read out charges while thinning out rows for a step width, there is an effect that it is possible to cause the image capturing device to perform high-speed charge readout processing.

For example, when the step width is "1", a count value increases by 1 at a time like 1, 2, 3 . . . . When the step width is "2", a count value increases by 2 at a time like 1, 3, 5 . . . (in the case of an up-count and when an initial value of a counter is "1"). On the other hand, in the case of down-count, when the step width is "1", a count value decreases by 1 at a time like . . . , 3, 2, 1. When the step width is "2", a count value decreases by 2 at a time like . . . 5, 3, 1. In other words, when the step width is "n", in the case of the up-count, a count value increases by n at a time with respect to an initial value of the counter like 1, 1+n, 1+2n . . . . In the case of the down-count, a count value decreases by n at a time with respect to the initial value of the counter like . . . , 1−2n, 1−n, 1.

It is preferable that, in the address generator, the control information includes a start line value of each of the address counters, and the control unit sets an initial value of each of the address counters on the basis of the start line value and causes each of the address counters to start counting from the set initial value.

With such a configuration, it is possible to cause each of the address counters to start counting from the initial value of the address counter set according to the start line value included in the control information. Therefore, it is possible to cause each of the address counters to start counting from a desired initial value by preparing the control information such that the desired initial value is set. Consequently, there is an effect that it is possible to cause the image capturing device to start the readout processing and the reset processing for accumulated charges from the photoelectric conversion element in an arbitrary position in the photoelectric conversion unit.

It is preferable that, in the address generator, the control information includes a line width value of each of the address counters, and the control unit sets a maximum count value of each of the address counters on the basis of the line width value and causes each of the address counters to perform a count operation within a range from the set initial value to the set maximum count value.

With such a configuration, it is possible to cause each of the address counters to perform a count operation in a range not exceeding the maximum count value set according to the line width value included in the control information. Therefore, there is an effect that it is possible to cause the image capturing device to perform the readout processing and the reset processing for accumulated charges only for an area formed by the photoelectric conversion element in a line position corresponding to each count value from the initial value to the maximum count value.

It is preferable that, in the address generator, the control information includes a step value, a start line value, and the line width value of each of the address counters, and the control unit sets a step width at the time of a count operation of each of the address counters on the basis of the step value, causes each of the address counters to perform counting at the set step width, sets an initial value of each of the address counters on the basis of the start line value, causes each of the address counters to start counting from the set initial value, sets a maximum count value of each of the address counters on the basis of the line width value, and causes each of the address counters to perform a count operation within a range from the set initial value to the set maximum count value.

With such a configuration, actions and effects equivalent to those of the address generator described above can be obtained.

It is preferable that, in the address generator, it is possible to set an initial value addition mode for causing the address counter to continuously and repeatedly perform the count operation while increasing the initial value by 1 when the set step width is equal to or larger than "2", and the control unit causes the address counter, for which the initial value addition mode is set, to repeatedly perform the count operation at the set step width in a range in which the count value does not exceed the maximum count value, adds 1 to the set initial value of the address counter every time the count operation is finished, and resets the initial value to the value before the addition when a value of the number of times of repetition of the count operation reaches a value same as the step width.

With such a configuration, it is possible to set, while increasing the initial values by "1" at a time, a value after the increase as a new initial value and cause the address counter, for which the initial value addition mode is set, to repeatedly perform the count operation within a range from the initial value to the maximum count value. Therefore, there is an effect that it is possible to easily cause the image capturing device to execute interlace readout processing and reset processing.

For example, when a range of first to sixteenth rows of the photoelectric conversion unit is up-counted at a step width "4", count values of a count operation for the first time are "1, 5, 9, and 13". For example, when an initial value is increased by "1" at a time, count values of a count operation in the second time are "2, 6, 10, and 14", count values of a count operation in the third time are "3, 7, 11, and 15", and count values of a count operation in the fourth time are "4, 7, 12, and 16". Since a value of the number of times of repetition is the same as a value of the step width, the present initial value is reset to the value "1" before the increase (before the addition) and the count operations are performed again.

It is preferable that, in the address generator, it is possible to set a repetition mode for casing the address counter to continuously and repeatedly perform a count operation performed within the range of the initial value to the maximum count value, and the control unit causes the address counter, for which the repetition mode is set, to continuously and repeatedly perform a count operation performed within a range from the set initial value to the set maximum count value.

With such a configuration, it is possible to cause the image capturing device to continuously and repeatedly apply the readout processing and the reset processing for accumulated charges to an area formed by the photoelectric conversion element in a line position corresponding to each count value from the initial value to the maximum count value. Consequently, for example, there is an effect that it is possible to cause the image capturing device to readout charges from an area in a part of the photoelectric conversion unit continuously for a plural number of times while the image capturing device is reading out charges in order line by line to the entire area of the photoelectric conversion unit.

It is preferable that, in the address generator, the control information includes a wait value of each of the address counters, and the control unit sets a wait count number, which is a count number for a wait of each of the address counters, on the basis of the wait value, causes, every time an operation in each time of the count operation repeatedly performed is finished in the address counter for which the repletion mode is set, the address counter to count the set wait count number, and outputs a signal for inactivating the count value to the address decode circuit while the address counter is counting the wait count number.

With such a configuration, it is possible to insert a wait between the times of the count operation repeatedly performed. Therefore, for example, there is an effect that it is possible to facilitate frame synchronization when the readout processing for charges is repeatedly applied to an area including an arbitrary number of rows.

It is preferable that, in the address generator, a plurality of the address decode circuits are provided in a number same as that of plural address counters that generate addresses of line positions of the photoelectric conversion elements subjected to the reset processing, and a signal for simultaneously changing the addresses of the line positions of the plural reset processing objects to an active state on the basis of output signals of the plural address decode circuits is outputted.

With such a configuration, there is an effect that it is possible to cause, with a simple configuration, the image capturing device to simultaneously perform the reset processing for plural lines.

According to another aspect of the invention, there is provided an image capturing device including a photoelectric conversion unit having arrayed therein in a matrix plural photoelectric conversion elements that convert received light into charges and accumulate the charges and a rolling shutter function. The image capturing device includes the address generator described above, a readout unit that nondestructively reads out the accumulated charges from the photoelectric conversion elements as the readout processing objects changed to the active state by the signal outputted from the address decode circuit, and a reset unit that resets the accumulated charges of the photoelectric conversion elements as the reset processing objects changed to the active state by the signal outputted from the address decode circuit.

With such a configuration, it is possible to execute the readout processing and the reset processing for accumulated charges on the photoelectric conversion elements changed to the active state by the output signals from the address generator described above. Therefore, actions and effects equivalent to those of the address generator described above can be obtained.

BRIEF DESCRIPTION OF THE DRAWINGS

The invention will be described with reference to the accompanying drawings, wherein like numbers reference like elements.

FIGS. 5A to 5D are diagrams for explaining operations in a normal mode.

FIGS. 7A to 7C are diagrams for explaining operations in a repetition mode.

FIGS. 9A to 9C are diagrams for explaining operations in an initial value addition mode.

FIGS. 12A to 12C are diagrams for explaining an operation that can simultaneously reset two lines.

DESCRIPTION OF EXEMPLARY EMBODIMENTS

FIG. 1 to FIGS. 12A to 12D are diagrams showing an address generator and an image capturing device according to an embodiment of the invention.

Figure 1:
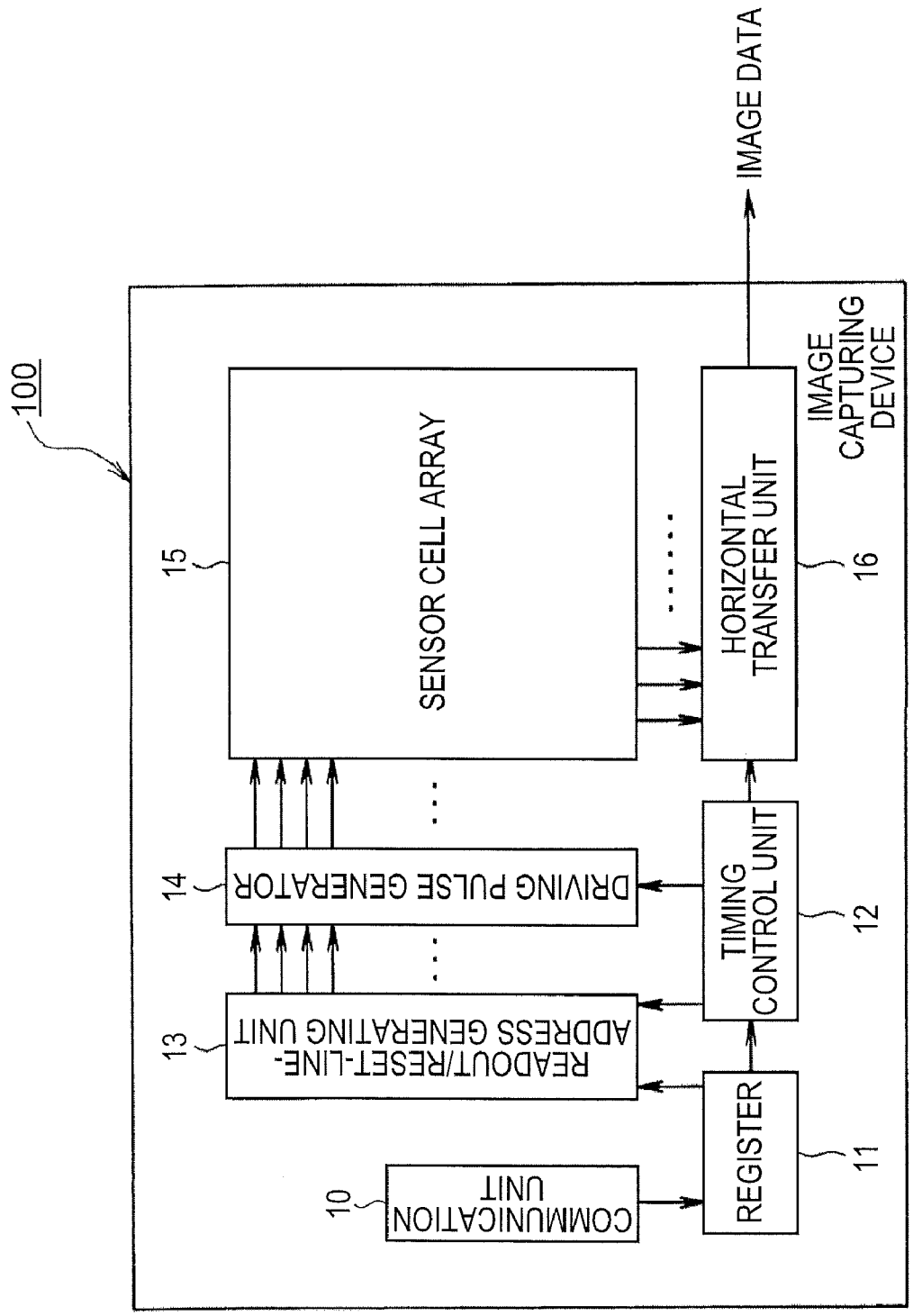
FIG. 1 is a block diagram showing the structure of an image capturing device 100 according to an embodiment of the invention.

FIG. 1 is a block diagram showing the structure of an image capturing device 100 according to the embodiment.

The image capturing device 100 is an image capturing device that controls exposure time with a rolling shutter system. As shown in FIG. 1, the image capturing device 100 includes a communication unit 10 that performs transmission and reception of data to and from an external system controller (not shown), a register 11 that stores various data from the system controller, a timing control unit 12 that controls operation timing of respective units, a readout/reset-line-address generating unit 13 that generates an address indicating line positions of sensor cells that are processing objects of readout processing for accumulated charges and reset processing for accumulated charges in a sensor cell array 15 described later, a driving pulse generator 14 that generates a signal for driving sensor cells on a select line on the basis of a selection signal from the readout/reset-line-address generating unit 13 and a control signal from the timing control unit 12, the sensor cell array 15, and a horizontal transfer unit 16 that outputs, in line units, image signal data (analog data) formed by charges read out from the sensor cells of the select line.

The communication unit 10 receives control data and the like for controlling operations of address counters in the readout/reset-line-address generating unit 13 from the system controller (not shown) and stores the control data and the like in the register 11.

The timing control unit 12 generates driving signals (a pixel clock, a horizontal synchronization signal, and a vertical synchronization signal) for driving the readout/reset-line-address generating unit 13, the driving pulse generator 14, and a horizontal transfer unit 16 and outputs these driving signals to the respective units.

The driving pulse generator 14 generates, on the basis of the selection signal from the readout/reset-line-address generating unit 13, driving pulse signals for executing readout processing for reading out charges accumulated in a sensor cell selected by the selection signal and reset processing for emptying (resetting) charges accumulated in the sensor cells and outputs the generated driving pulse signals to the sensor cell array 15.

In the sensor cell array 15, plural sensor cells (pixels) formed by using a CMOS are disposed in a matrix, an address line, a reset line, and a readout line are connected to sensor cells in each of lines in common, various driving pulse signals are transmitted to the sensor cells forming the respective lines via the three control lines. When the address line and the readout line are activated, the sensor cell array 15 transfers accumulated charges to the horizontal transfer unit 16 through the readout line.

The horizontal transfer unit 16 stores pixel signal data, which are read out from respective pixels of the select line of the sensor cell array 15, in line memories for respective lines (not shown) of the respective pixels and outputs the stored pixel signal data. The horizontal transfer unit 16 has the line memories by the number of select-line-address generating circuits for readout processing described later and outputs the pixel signal data using the different line memories for respective kinds of readout processing performed in a time division manner.

The internal structure of the readout/reset-line-address generating unit 13 is explained with reference to FIGS. 2 and 3.

Figure 2:
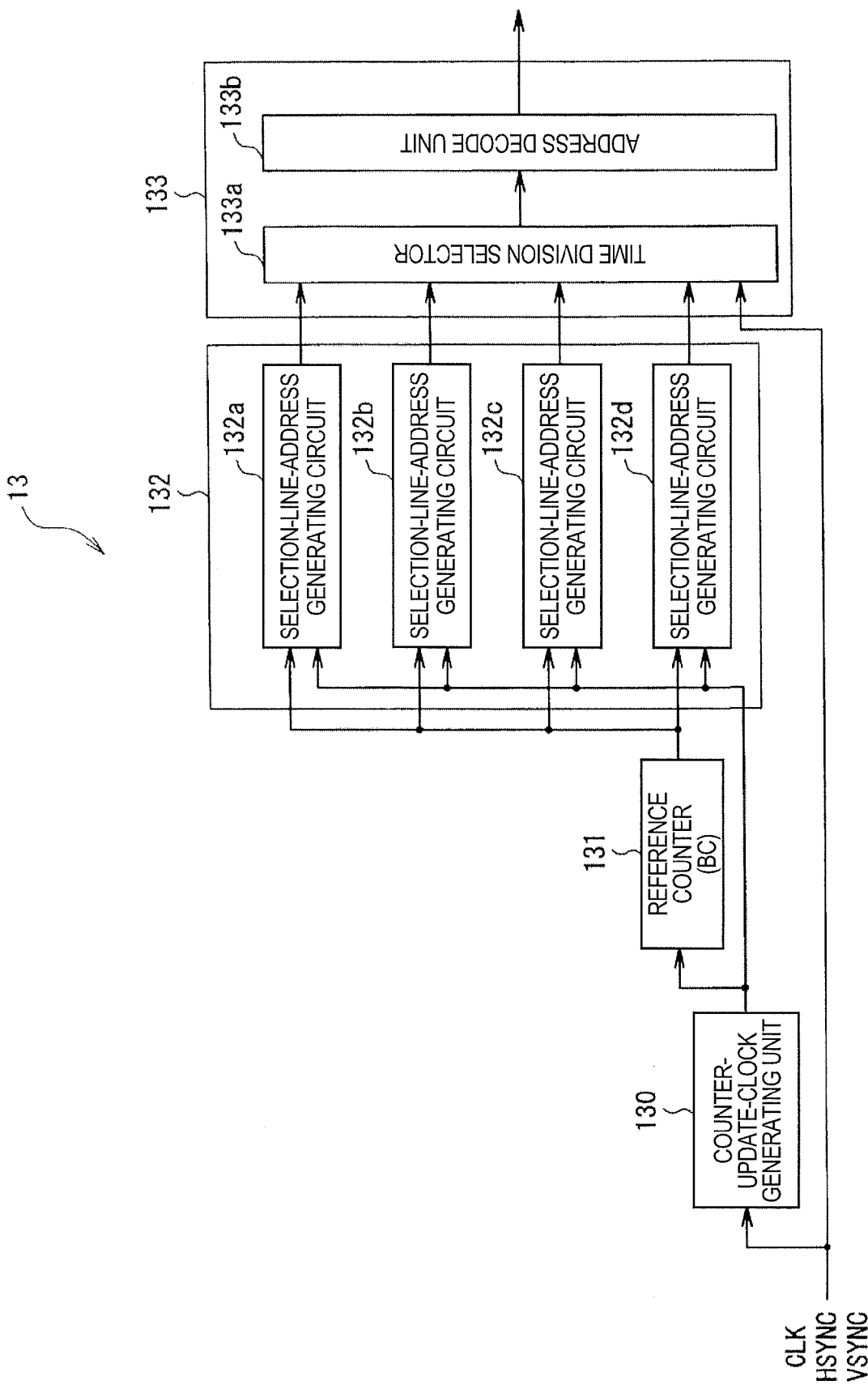
FIG. 2 is a block diagram showing the internal structure of a readout/reset-line-address generating unit 13.
Figure 3:
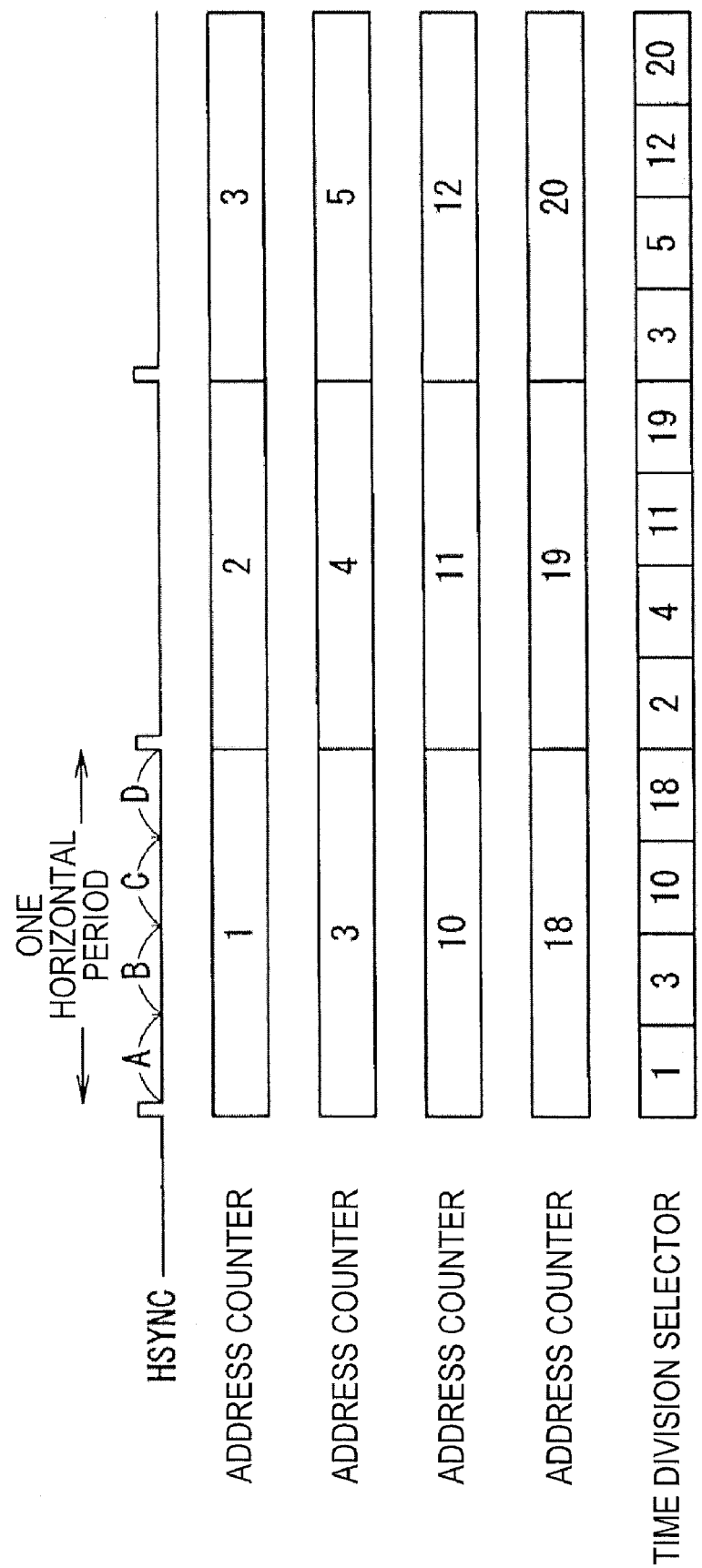
FIG. 3 is a diagram showing an example of operations of a time division selector.

FIG. 2 is a block diagram showing the internal structure of the readout/reset-line-address generating unit 13. FIG. 3 is a diagram showing an example of operations of a time division selector.

As shown in FIG. 2, the readout/reset-line-address generating unit 13 includes a counter-update-clock generating unit 130, a reference counter 131, a select-line-address generating unit 132, and an address decode unit 133.

The counter-update-clock generating unit 130 generates a clock, which is a scanning period of the sensor cells of one line of the sensor cell array 15, on the basis of a pixel clock (CLK) and a horizontal synchronization signal (HSYNC) inputted from the timing control unit 12 and outputs the clock to the reference counter 131 and respective select-line-address generating circuits (described later) of the select-line-address generating unit 132. For example, the counter-update-clock generating unit 130 may directly output the horizontal synchronization signal from the timing control unit 12 or may generate a counter update clock anew by re-sampling the horizontal synchronization signal with an operation clock in the inside thereof and output the counter update lock. In this embodiment, the latter method is used.

The reference counter 131 executes a count operation on the basis of the counter update clock inputted from the counter-update-clock generating unit 130 and the pixel clock and the vertical synchronization signal (VSYNC) inputted from the timing control unit 12. Specifically, the reference counter 131 repeatedly counts a range (20) of "the number of active pixel lines (e.g., 16)+the number of return pixel lines (e.g., 4)" with respect to the sensor cell array 15.

The select-line-address generating unit 132 has select-line-address generating circuit provided in the number same as the number of time divisions of readout processing for accumulated charges and reset processing for accumulated charges in one horizontal period. The select-line-address generating unit 132 independently controls the respective select-line-address generating circuit on the basis of various control data stored in the register 11 and generates addresses indicating line positions as processing objects. In this embodiment, each horizontal period is equally time-divided into four periods. Therefore, the select-line-address generating unit 132 has four circuits, i.e., select-line-address generating circuits 132a to 132d. At least one of these four circuits is a circuit for reset processing. The remaining circuits are circuits for readout processing.

The address decode unit 133 includes a time division selector 133a and an address decode circuit 133b.

The time division selector 133a selects the select-line-address generating circuits 132a to 132b one by one in a time division manner and outputs an address (a count value) generated by the selected select-line-address generating circuit to the address decode circuit 133b.

Specifically, select-line-address generating circuits selected in the respective four periods in the respective horizontal periods are determined in advance. The time division selector 133a sequentially selects the select-line-address generating circuits corresponding to the respective periods on the basis of the determination. For example, as shown in FIG. 3, when one horizontal period is time-divided into four periods A to D, the time division selector 133a selects the select-line-address generating circuit 132a in the period A, selects the select-line-address generating circuit 132b in the period B, selects the select-line-address generating circuit 132c in the period C, and selects the select-line-address generating circuit 132d in the period D. The time division selector 133a outputs output values (addresses) of the selected circuits to the address decode circuit 133b. Therefore, in one horizontal period, the four addresses are sequentially outputted to the address decode circuit 133b in a time division manner.

The switching of the time division selector 133a may be controlled from the outside by using a synchronization signal.

Although not shown in the figure, a smaller circuit configuration is realized when the reference counter 131 is decoded to generate a switching control signal for the time division selector 133a.

When an address (a count value) is inputted from the time division selector 133a, the address decode circuit 133b outputs a selection signal for activating a sensor cell in a line position indicated by the inputted address in the sensor cell array 15 to the driving pulse generator 14.

The internal structure of the select-line-address generating circuit 132a is explained with reference to FIG. 4.

Figure 4:
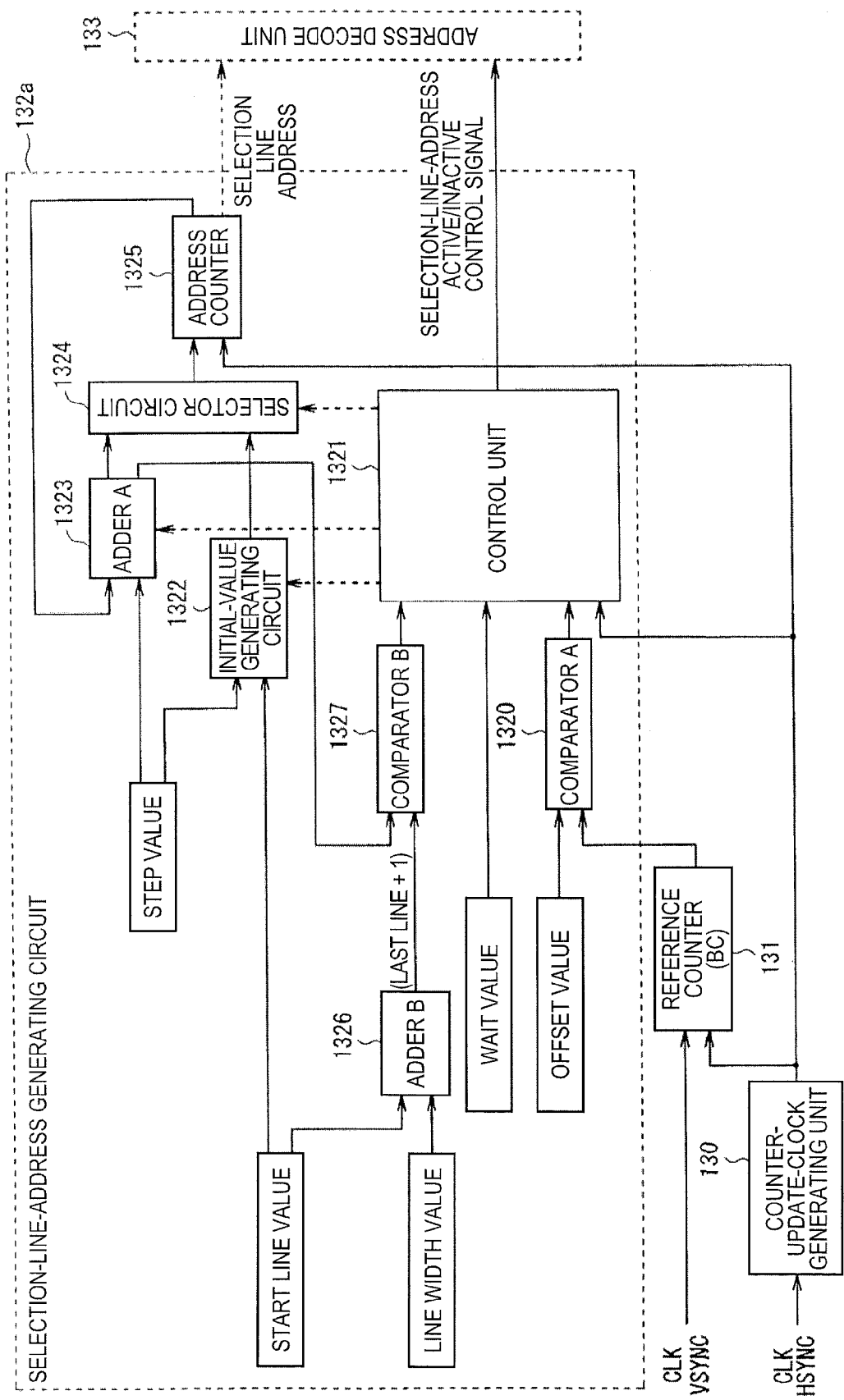
FIG. 4 is a block diagram showing an example of the internal structure of a select-line-address generating circuit 132*a*.

FIG. 4 is a block diagram showing an example of the internal structure of the select-line-address generating circuit 132a in the case of up-count.

As shown in FIG. 4, the select-line-address generating circuit 132a includes a comparator A 1320, a control unit 1321, an initial-value generating circuit 1322, an adder A 1323, a selector circuit 1324, an address counter 1325, an adder B 1326, and a comparator B 1327.

In this embodiment, the counter update clock is a clock having one horizontal scanning period as a period for one clock. The update of a count value in the address counter 1325 is performed at a rising edge of the counter update clock. Therefore, a definition of a period in which the counter update clock is "High" is unnecessary.

As control data of the address counter 1325, setting information for respective operation modes, an offset value, a start line value, a line width value, a step value, a wait value, and the like are stored in the register 11. These kinds of information are set by a user with respect to the respective select-line-address generating circuit 132a to 132d. In the respective select-line-address generating circuits, the information is used for control of a count operation of the address counter 1325.

In this embodiment, there are a normal mode, a repetition mode, and an initial value addition mode as the operation modes. Details of these modes are described later.

The offset value is used for determining start timing of the count operation of the address counter 1325.

The start line value is a value for setting an initial value of a count value of the address counter 1325 and a count width (range) for performing counting.

The line width value is a value for setting a count width (range) for performing counting. Specifically, the count width is set from the start line value and the line width value.

The step value is a value for setting a step width at the time of count-up of the address counter 1325.

The wait value is a value for inserting waits among count operations in respective times in repeating the count operation performed in a range from an initial value to a maximum count value of a count when the repetition mode or the initial value addition mode is set.

The comparator A 1320 is a circuit that compares the offset value acquired from the register 11 and the count value of the reference counter 131. When the offset value and the count value coincide with each other, the comparator A 1320 outputs a signal for notifying to that effect to the control unit 1321.

The control unit 1321 has a function of controlling the count operation of the address counter 1325 by controlling operations of the initial-value generating circuit 1322, the adder A 1323, and the selector circuit 1324. The control unit 1321 also has a function of outputting a control signal for controlling a select line address to be active and inactive to the address decode unit 133 according to the count operation of the address counter 1325.

The initial-value generating circuit 1322 is a circuit that outputs the start line value stored in the register 11 to the selector circuit 1324 and generates an initial value on the basis of the step value stored in the register 11 when the initial-value addition mode is set.

The adder A 1323 is a circuit that adds up the counter value of the address counter and the step value stored in the register 11.

The selector circuit 1324 is a circuit that outputs one of a value inputted from the adder A 1323 and a value inputted from the initial-value generating circuit 1322 to the address counter 1325 according to the control signal from the control unit 1321.

The address counter 1325 has a function of outputting the value inputted from the selector circuit 1324 to the address decode unit 133 as an address of a select line and outputting the value to the adder A 1323.

The adder B 1326 is a circuit that adds up the start line value and the line width value stored in the register 11.

The comparator B 1327 is a circuit that compares an addition result A of the adder A 1323 and an addition result of the adder B 1326, detects that the addition result A is equal to or larger than the addition result B, and notifies the control unit 1321 to that effect.

Operations common in the normal mode, the repetition mode, and the initial value addition mode are explained below.

First, when the control unit 1321 detects the start of the operation, the control unit 1321 comes into a state of "start wait". In this state, when the signal for notifying that the offset value and the count value of the reference counter 131 coincide with each other is inputted from the comparator A 1320, the control unit 1321 outputs, to the initial-value generating circuit 1322, an instruction signal for instructing the initial-value generating circuit 1322 to directly input the start line value acquired from the register 11 to the selector circuit 1324.

When the instruction signal is inputted, the initial-value generating circuit 1322 directly outputs the start line value acquired from the register 11 to the selector circuit 1324.

Moreover, the control unit 1321 controls the selector circuit 1324 such that the start line value inputted to the selector circuit 1324 from the initial-value generating circuit 1322 is directly outputted to the address counter 1325. Specifically, when the offset value and the count value coincide with each other, the control unit 1321 outputs a signal notifying to that effect to the selector circuit 1324.

Consequently, the selector circuit 1324 outputs the start line value inputted from the initial-value generating circuit 1322 to the address counter 1325. The start line value is set as an initial value of a count value in the address counter 1325.

Moreover, the control unit 1321 outputs a control signal for activating a select line address to the address decode unit 133 and changes a state of the inside thereof to a "count-up mode" at timing for updating (counting up) the address counter 1325 (the rising edge of the counter update clock).

The address decode circuit 133b in the address decode unit 133 receives the address value inputted from the time division selector 133a and applies decode processing to the address value only when the control signal for activating the select line address is received from the control unit 1321. Specifically, the decode processing is processing for outputting a selection signal for activating a sensor cell in a line position indicated by the received address value to the driving pulse generator 14. The driving pulse generator 14 outputs a pulse signal corresponding to designated one of the readout processing and the reset processing to the sensor cell array 15 on the basis of the selection signal from the address decode circuit 133b.

When the state of the inside is changed to the "count-up mode", the adder A 1323 adds the step value acquired from the register 11 to the count value from the address counter 1325 and outputs the addition result A to the selector circuit 1324 and the comparator B 1327. However, when an instruction for "prohibition of addition" is received from the control unit 1321, the adder A 1323 directly outputs the count value inputted from the address counter 1325 to the selector circuit 1324 and the comparator B 1327.

On the other hand, the adder B 1326 adds up the start line value and the line width value acquired from the register 11 and inputs a result of the addition to the comparator B 1327. Consequently, "a maximum count value (an address value of a last line)+1" is obtained as the addition result B.

The comparator B 1327 compares the addition result B inputted from the adder B 1326 and the addition result A inputted from the adder A 1323. When the addition result A is equal to or larger than the addition result B, the comparator B 1327 outputs a signal for notifying to that effect to the control unit 1321.

When the notification is received from the comparator B 1327, the control unit 1321 performs an operation corresponding to a set mode stored in the register 11.

As described above, the modes that can be set in this embodiment are the three kinds of modes, i.e., the normal mode, the repetition mode, and the initial value addition mode.

First, the normal mode is explained.

The normal mode indicates a state in which the repletion mode and the initial value addition mode are not set. The normal mode is a mode for causing the address counter 1325 to execute, every time the count value of the reference counter 131 and the offset value coincide with each other, a count-up operation until it is detected that the addition result A is equal to or larger than the addition result B.

Specifically, when it is detected that the addition result A is equal to or larger than the addition result B, the control unit 1321 returns to the "start wait" state and outputs the control signal for inactivating the address of the select line to the address decode unit 133 at the rising edge of the counter update clock.

When the count value of the reference counter 131 and the offset value coincide with each other again (notification of the coincidence is received from the comparator A 1320), the control unit 1321 outputs, to the initial-value generating circuit 1322, an instruction signal for instructing the initial-value generating circuit 1322 to directly input the start line value inputted to the initial-value generating circuit 1322 to the selector circuit 1324. The control unit 132 causes the address counter 1325 to execute the count-up operation same as the above until it is detected that the addition result A is equal to or larger than the addition result B.

Next, the repetition mode is explained.

The repetition mode is a mode for causing the address counter 1325 to continuously and repeatedly execute the count-up operation until the addition result A is equal to or larger than the addition result B in the range from the initial value to the maximum count value.

Specifically, when the repetition mode is set, the control unit 1321 receives the notification to the effect that the addition result A is equal to or larger than the addition result B from the comparator B 1327. First, the control unit 1321 acquires the wait value from the register 11 and performs counting of the counter update clock by the number of times equal to the wait value. Then, in the same manner as the above, the control unit 1321 sets the start line value in the address counter 1325 via the initial-value generating circuit 1322 and the selector circuit 1324 and executes the count operation again from the set initial value.

The control unit 1321 outputs, simultaneously with starting a wait operation, the control signal for inactivating the address of the select line to the address decode unit 133. When the wait value is "0", the wait operation is omitted and setting of an initial value is performed.

When the control signal for inactivating the address of the select line is received from the control unit 1321, the address decode circuit 133b of the address decode unit 133 executes an operation for inactivating all select lines regardless of what value the address value inputted from the time division selector 133a is.

When the repletion mode is set, the control unit 1321 receives the notification indicating that the offset value and the count value of the reference counter 131 coincides with each other from the comparator A 1320 only for the first time and neglects the notification for the second and subsequent times.

Next, the initial value addition mode is explained.

The initial value addition mode is a mode for causing, when the step value is equal to or larger than "2", the address counter 1325 to perform a repetition count operation, adding, until the step value and the number of times of repetition coincide with each other, "1" to the present initial value of the address counter 1325 every time the count-up operation is performed until a comparison result of the comparator B indicates that the addition result A is equal to or larger than the addition result B, and causing the address counter 1325 to perform the next count operation with a value after the addition set as a new initial value.

Specifically, when the initial value addition mode is set, the control unit 1321 receives the notification to the effect that the addition result A is equal to or larger than the addition result B from the comparator B 1327. First, the control unit 1321 receives the wait value from the register 11, performs counting of the counter update clock by the number of times equal to the wait value, and, then, outputs an instruction signal for causing the initial-value generating circuit 1322 to execute addition processing for the initial value.

When the instruction signal is inputted from the control unit 1321, the initial-value generating circuit 1322 adds "1" to the present initial value and outputs a result of the addition to the selector circuit 1324 as a new initial value.

Moreover, the control unit 1321 controls the selector circuit 1324 such that the new initial value inputted to the selector circuit 1324 from the initial-value generating circuit 1322 is directly outputted to the address counter 1325.

Consequently, the selector circuit 1324 outputs the new initial value inputted from the initial-value generating circuit 1322 to the address counter 1325. The new initial value is set as an initial value of a count value in the address counter 1325.

The wait operation and the initial value addition operation are repeatedly executed by the number of times equal to a value of the step width. When a value of the number of times of repetition reaches a value same as the value of the step width, the control unit 1321 resets the initial value after the addition to the first initial value before the addition and executes the count operation and the initial value addition operation same as above again from the initial value. For example, when the step width is "4" and the first initial value before the addition is "1", the control unit 1321 performs count operations from the first initial value "1" and new initial values "2", "3", and "4", which are obtained by increasing the initial value by 1 at a time, in order. Thereafter, the control unit 1321 resets the initial value "4" in the count operation for the fourth time to the first initial value "1" and repeats the same count operation again.

In the case of down-count, the processing is changed to processing for reducing the step value and the line width value. Processing of the adder B 1326 is specifically represented as "start line value−line width value+1". Since the down-count is performed, the calculation of the comparator B 1327 is changed to "addition result A≦addition result B". In the initial-value generating circuit 1322, "start line value+ step value−1" is set as an initial value. After the comparator A 1320 detects the coincidence and notifies the control unit 1321 of the coincidence, the control unit 1321 shifts to the down-count mode. The other operations are basically the same as those in the up-count.

Since configurations of the select-line-address generating circuits 132*b* to 132*d* are the same as that of the select-line-address generating circuit 132*a*, explanation of the configurations is omitted.

More specific operations in this embodiment are explained with reference to FIGS. 5 to 10.

First, operations of address generation processing for a readout line and a reset line and reset processing and readout processing for accumulated charges with respect to a select line at the time when the "normal mode" is set for all the select-line-address generating circuits 132*a* to 132*d* are explained with reference to FIGS. 5 and 6.

FIGS. 5A to 5D are diagrams for explaining operations of the normal mode. FIG. 5A is a diagram showing an example of a line structure of a pixel. FIG. 5B is a diagram showing an example of control data. FIGS. 5C and 5D are diagrams showing an example of output values of the respective counters and output values of the respective time division selectors. FIG. 6 is a diagram showing an example of an arithmetic operation of the select-line-address generating circuit for the control data shown in FIG. 5B.

The select-line-address generating circuit 132*a* is used as the select-line-address generating circuit for the reset processing. The select-line-address generating circuits 132*b* to 132*d* are used as the select-line-address generating circuits for the readout processing.

As shown in FIG. 5A, active pixel lines are pixel lines with line numbers 1 to 16 and return pixel lines are pixel lines with line numbers 17 to 20. In other words, pixels are actually present in the pixel lines with pixel numbers 1 to 16 but pixels are not present in the pixel lines with the pixel numbers 17 to 20. Therefore, the reference counter 131 is controlled to repeatedly perform a count operation in a range of "0" to "19" at a step width "1".

First, control data is transmitted from the system controller to the image capturing device 100 and stored in the register 11 via the communication unit 10.

As shown in FIG. 5B, as the offset value of the control data, "0", "3", "10", and "19" are set (stored) for the select-line-address generating circuits 132*a* to 132*d*, respectively. As the start line value, "1" is set for the select-line-address generating circuits 132*a* to 132*d*. As the line width value, "16" is set for the select-line-address generating circuits 132*a* to 132*d*. As the step value, "1" is set for the select-line-address generating circuits 132*a* to 132*d*.

When an instruction for starting an operation is received from the system controller, the respective select-line-address generating circuits 132*a* to 132*d* of the readout/reset-line-address generating unit 13 shift to a start wait state.

As shown in FIG. 5C, when the reference counter 131 (BC in the figure) starts a count operation and a count value of the reference counter 131 is set to "0", the count value coincides with the offset value "0" of the select-line-address generating circuit 132*a*. Therefore, a start line value "1" is set as an initial value in the address counter 1325*a* (in the following explanation, "a" is affixed after respective reference numerals in order to distinguish components from those of the other circuits). Since a step width of the select-line-address generating circuit 132*a* is "1", the count value is counted up from the initial value "1" to a count width value (a maximum count value) "16" by 1 at a time (CLS in FIG. 5C). Update timing of the reference counter 131 and update timing of the respective address counters are the same.

On the other hand, when the reference counter 131 counts up by 1 at a time according to the counter update clock and the count value of the reference counter 131 reaches "3", the count value "3" coincides with the offset value "3" of the select-line-address generating circuit 132*b*. Therefore, the start line value "1" is set as an initial value in the address counter 1325*b* (in the following explanation, "b" is affixed after respective reference numerals in order to distinguish components from those of the other circuits). Since a step width of the select-line-address generating circuit 132*b* is "1", the address counter 1325*b* counts up from the initial value "1" to the count width value (the maximum count value) "16" by 1 at a time (LOAD1 in FIG. 5C).

In the select-line-address generating circuit 132*a*, the count operation of the address counter 1325*a* is performed with the count value "0" of the reference counter 131 as a trigger. On the other hand, the readout processing (LOAD1) is performed with the count value "3" of the reference counter 131 as a trigger. Therefore, in the readout processing, exposure time is three horizontal periods (3H).

Similarly, in the select-line-address generating circuits 132*c* and 132*d*, when count values of the reference counter 131 are "10" and "19", the count values coincide with the offset values thereof. Therefore, the address counters 1325*c* and 1325*d* perform count-up of the count values from the initial value "1" to the count width value (the maximum count value) "16" at the step width "1" (LOAD2 and LOAD3 in FIG. 5C).

Because of the same reason as LOAD1, exposure time of LOAD2 is 10H and exposure time of LOAD3 is 19H.

On the other hand, as shown in FIG. 5D, when output values of the address counters 1325*a* to 1325*d* in an encircled portion in FIG. 5C are referred to as an example, the time division selector 133*a* of the address decode unit 133 selects a count value (14) of the select-line-address generating circuit 132*a* and outputs the count value to the address decode circuit 133*b* in the first period A of the four period A to D obtained by equally time-dividing one horizontal period. Subsequently, the time division selector 133*a* outputs count values (11), (4), and (15) of the select-line-address generating circuit 132*a* in the next periods B, C, and D, respectively.

While the control signal indicating that the select line address is active is inputted, the address decode circuit 133*b* outputs a selection signal for activating a line of an address value inputted from the time division selector 133*a* to the driving pulse generator 14.

Figure 6:
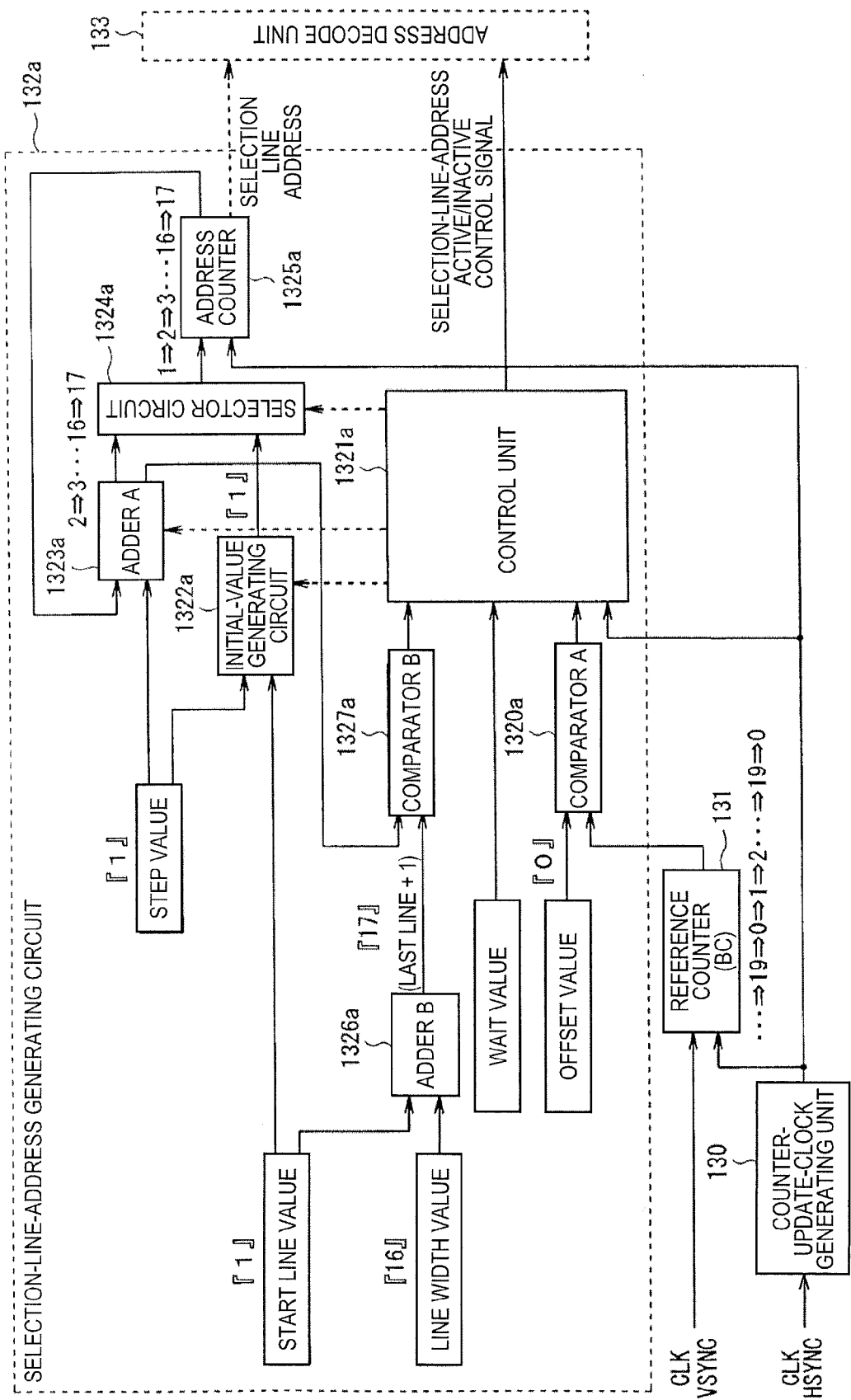
FIG. 6 is a diagram showing an example of an arithmetic operation of the select-line-address generating circuit applied to control data in FIG. 5B.

The arithmetic operations of the internal circuits are explained more in detail with reference to FIG. 6 with the select-line-address generating circuit 132*a* cited as an example.

As shown in FIG. 6, the comparator A 1320*a* compares the offset value "0" and a count value of the reference counter 131. When the count value is "0", the comparator A 1320*a* detects coincidence of the offset value and the count value and outputs a notification signal indicating that the coincidence is detected to the control unit 1321a.

The control unit 1321a is in the "start wait" state at present. Therefore, when the notification of the detection of the coincidence is received, the control unit 1321a shifts to the "count-up mode" and outputs a control signal indicating that the select line address is active to the address decode unit 133 at timing of a rising edge of the next counter update clock.

Moreover, the control unit 1321a outputs, to the initial-value generating circuit 1322a, an instruction signal for instructing the initial-value generating circuit 1322a to output "start line value=1" to the selector circuit 1324a. The control unit 1321a also outputs, to the selector circuit 1324a, an instruction signal for instructing the selector circuit 1324a to output an input value (=1) from the initial-value generating circuit 1322a to the address counter 1325a. Consequently, an initial value "1" is set in the address counter 1325a. This set value "1" is outputted to the address decode unit 133 and the adder A 1323a.

Furthermore, the control unit 1321a having shifted to the count-up mode outputs, to the selector circuit 1324a, an instruction signal for instructing the selector circuit 1324a to output the input value from the adder A 1323a to the address counter 1325a. On the other hand, since "1" is inputted from the address counter 1325a, the adder A 1323a adds the step value "1" to this "1" and outputs a result of the addition "2" to the selector circuit 1324a.

Therefore, "2" inputted from the adder A 1323a is outputted from the selector circuit 1324a to the address counter 1325a at timing of a rising edge of the next counter update clock. Consequently, "2" is outputted from the address counter 1325a to the address decode unit 133 and the adder A 1323a.

In this way, the "step value=1" is added to the output value of the address counter 1325a and a result of the addition is outputted to the address counter 1325a and, then, outputted to the address decode unit 133.

While the count-up operation is performed, the adder B 1326a adds up the "start line value=1" and the "line width value=16" and outputs a result of the addition "17" to the comparator B 1327a.

The comparator B 1327a compares the addition result "17" of the adder B 1326a and the addition result of the adder A 1323a and detects that the addition result A is equal to or larger than the addition result B. The comparator B 1327a outputs a signal for notifying to that effect to the control unit 1321a. In other words, at a point when a count value of the address counter 1325a reaches "16", the addition result A of the adder A 1323a reaches "17". Consequently, since 17 is equal to or larger than the addition result B (=17), the condition "addition result A≧addition result B" is satisfied. Therefore, the comparator B 1327a detects that the condition is satisfied and outputs a notification signal to the control unit 1321a.

When the notification is received, the control unit 1321a outputs an instruction signal for "prohibition of addition" to the adder A 1323a and outputs a control signal indicating that the select line address is inactive to the address decode unit 133. Simultaneously with the output of these signals, the control unit 1321a shifts to the "start wait" state. At this point, the count value of the address counter 1325a has been updated to "17".

The adder A 1323a receives the instruction for "prohibition of addition" from the control unit 1321a. Therefore, the adder A 1323a continues to output "17", which is the output value of the address counter 1325a, as an output value of the adder A 1323a. Consequently, as shown in FIG. 5C, while a count value of the reference counter 131 is between 17 and 0, the count value of the address counter 1325a stays at "17" (an inactive value).

When the comparator A 1320a detects coincidence of the offset value and the count value of the reference counter 131 again, the control unit 1321a shifts to the "count-up mode". Simultaneously with this, the control unit 1321a outputs a control signal indicating that the select line address is active to the address decode unit 133 and outputs a release signal for "prohibition of addition" to the adder A 1323a.

Thereafter, the control unit 1321a executes the count-up operation in the same manner as above.

Processing same as above is applied to LOAD1 to LOAD3.

When the address generation processing is executed in this way, in the address decode unit 133, addresses generated by the select-line-address generating circuit 132a to 132b are inputted to the time division selector 133a and the respective input values are selected in a time division manner and outputted to the address decode circuit 133b.

The address decode circuit 133b decodes, for the select-line-address generating circuit that outputs the control signal indicating that the select line address is active, an address inputted from the time division selector and outputs a control signal for activating a sensor cell of a line number indicated by the address to the driving pulse generator 14.

The driving pulse generator 14 outputs, on the basis of a selection signal from the address decode circuit 133b, a driving pulse for resetting or reading out accumulated charges of a sensor cell of a line number indicated by the selection signal to the sensor cell array 15.

Specifically, a selection signal is inputted through an address line, a line of a pixel that is caused to perform a reset operation or a readout operation is activated (selected), when the pixel is caused to perform the reset operation, a signal for instructing the reset operation is inputted to respective sensor cells of the line selected through the selection signal, and, when the pixel is caused to perform readout of a pixel signal, a signal for instructing transfer of accumulated charges is inputted to the sensor cells through a readout line.

The respective sensor cells selected by the selection signal perform the reset operation (an operation for emptying accumulated charges) when a signal for instruction the reset operation is inputted. When a signal for transferring accumulated charges is inputted, the sensor cells transfer the accumulated charges to the horizontal transfer unit 16 through a signal line.

On the other hand, the horizontal transfer unit 16 accumulates pixel signal data transferred from the respective sensor cells of the select line in a line memory and outputs the pixel signal data in line units.

Operations of the address generation processing for the readout line and the reset line and the reset processing and the readout processing for accumulated charges for the select line at the time when the "repetition mode" is set in a part of the select-line-address generating circuits 132a to 132b are explained with reference to FIGS. 7 and 8.

FIGS. 7A to 7C are diagrams for explaining an operation of the repetition mode. FIG. 7A is a diagram showing an example of a line structure of a pixel. FIG. 7B is a diagram showing an example of control data. FIG. 7C is a diagram showing an example of output values of respective counters. FIG. 8 is a diagram showing an example of an arithmetic operation of the select-line-address generating circuit for the control data shown in FIG. 7B.

Roles of the respective select-line-address generating circuit are the same as those described above.

As shown in FIG. 7A, active pixel lines are pixel lines with line numbers 1 to 16 and return pixel lines are pixel lines with line numbers 17 to 20. Moreover, among the active pixel lines, pixel lines with line numbers 1 to 3 are high speed readout object pixel lines and pixel lines with line numbers 4 to 16 are normal readout object pixel lines. The reference counter 131 is controlled to repeat the count operation in a range of "0" to "19" at the step width "1".

First, control data is transmitted from the system controller to the image capturing device 100 and stored in the register 11 via the communication unit 10.

As shown in FIG. 7B, as the offset value of the control data, "0", "1", "4", and "10 are set (stored) for the select-line-address generating circuits 132a to 132d, respectively. As the start line value, "1" is set for the select-line-address generating circuits 132a and 132b and "4" is set for the select-line-address generating circuit 132c and 132d. As the line width value, "16" is set for the select-line-address generating circuits 132a, "3" is set for the select-line-address generating circuit 132b, and "13" is set for the select-line-address generating circuits 132c and 132d. As the step value, "1" is set for the select-line-address generating circuits 132a to 132d. As the wait value, "1" is set for the select-line-address generating circuit 132b. The repetition mode is set for the select-line-address generating circuit 132b. The normal mode is set for the remaining circuits.

When an instruction for starting an operation is received from the system controller, the respective select-line-address generating circuits 132a to 132d of the readout/reset-line-address generating unit 13 shift to the start wait state.

As shown in FIG. 7C, when the reference counter 131 (BC in the figure) starts a count operation and a count value of the reference counter 131 is set to "0", the count value coincides with the offset value "0" of the select-line-address generating circuit 132a. Therefore, a start line value "1" is set as an initial value in the address counter 1325a. Since a step width of the select-line-address generating circuit 132a is "1", the count value is counted up from the initial value "1" to the count width value (the maximum count value) "16" by 1 at a time (CLS in FIG. 7C). Update timing of the reference counter 131 and update timing of the respective address counters are the same.

On the other hand, when the reference counter 131 counts up by 1 at a time according to the counter update clock and the count value of the reference counter 131 reaches "1", the count value "1" coincides with the offset value "1" of the select-line-address generating circuit 132b. Therefore, the start line value "1" is set as an initial value in the address counter 1325b. Since a step width of the select-line-address generating circuit 132b is "1", the address counter 1325b counts up from the initial value "1" to a count width value (a maximum count value) "3" by 1 at a time. Moreover, when the count-up operations from "1" to "3" are finished, after one clock of wait, the count-up operation from the initial value "1" to the maximum count value "3" is performed again. In this way, the count-up operations from "1" to "3" are continuously and repeatedly performed with one clock of wait inserted among the respective count-up operations (LOAD1 in FIG. 7C).

When the count value of the reference counter 131 reaches "4", the count value "4" coincides with the offset value "4" of the select-line-address generating circuit 132. Therefore, the start line value "4" is set as an initial value in the address counter 1325b. Since the step width of the select-line-address generating circuit 132c is "1", the address counter 1325c counts up from the initial value "4" to a count width value (a maximum count value) "13" by 1 at a time.

Exposure time of LOAD2 is 1H.

When the count value of the reference counter 131 reaches "10", the count value "10" coincides with the offset value "10" of the select-line-address generating circuit 132c. Therefore, the start line value "4" is set as an initial value of the address counter 1325b. Since the step width of the select-line-address generating circuit 132c is "1", the address counter 1325c counts up from the initial value "4" to the count width value (the maximum count value) "13" by 1 at a time.

Exposure time of LOAD3 is 7H.

Figure 8:
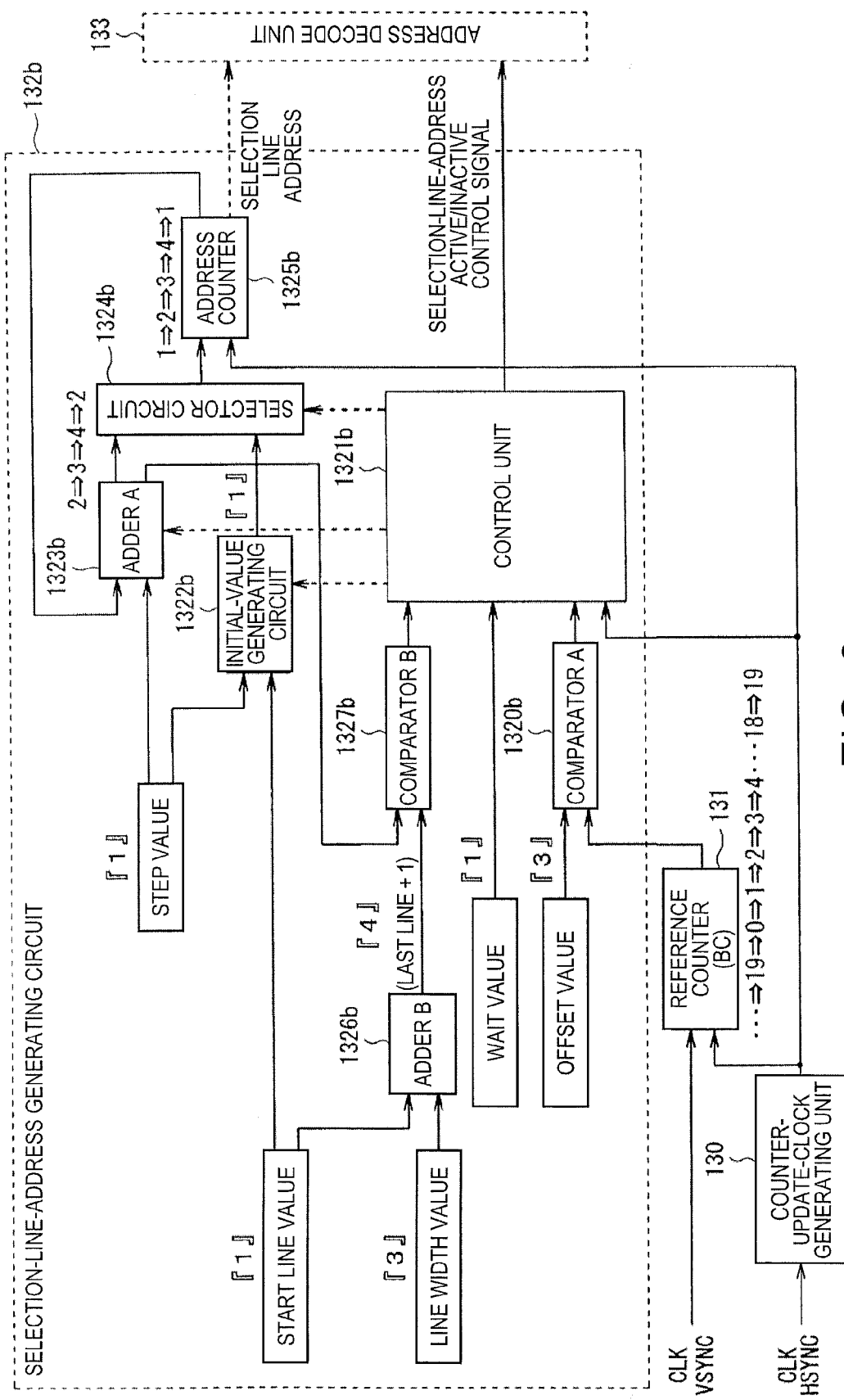
FIG. 8 is a diagram showing an example of an arithmetic operation of the select-line-address generating circuit applied to control data in FIG. 7B.

The arithmetic operations of the internal circuits are explained more specifically with reference to FIG. 8 with the select-line-address generating circuit 132b cited as an example.

As shown in FIG. 8, the comparator A 1320b compares the offset value "1" and a count value of the reference counter 131. When the count value is "1", the comparator A 1320b detects coincidence of the offset value and the count value and outputs a notification signal indicating that the coincidence is detected to the control unit 1321b.

The control unit 1321b is in the "start wait" state at present. Therefore, when the notification of the detection of the coincidence is received, the control unit 1321b shifts to the "count-up mode" and outputs a control signal indicating that the select line address is active to the address decode unit 133 at timing of a rising edge of the next counter update clock.

Moreover, the control unit 1321b outputs, to the initial-value generating circuit 1322b, an instruction signal for instructing the initial-value generating circuit 1322b to output "start line value=1" to the selector circuit 1324b. The control unit 1321b also outputs, to the selector circuit 1324b, an instruction signal for instructing the selector circuit 1324b to output an input value (=1) from the initial-value generating circuit 1322b to the address counter 1325b. Consequently, an initial value "1" is set in the address counter 1325b. This set value "1" is outputted to the address decode unit 133 and the adder A 1323b.

Furthermore, the control unit 1321b having shifted to the count-up mode outputs, to the selector circuit 1324b, an instruction signal for instructing the selector circuit 1324b to output the input value from the adder A 1323b to the address counter 1325b. On the other hand, since "1" is inputted from the address counter 1325b, the adder A 1323b adds the step value "1" to this "1" and outputs a result of the addition "2" to the selector circuit 1324b.

Therefore, "2" inputted from the adder A 1323b is outputted from the selector circuit 1324b to the address counter 1325b at timing of a rising edge of the next counter update clock. Consequently, "2" is outputted from the address counter 1325b to the address decode unit 133 and the adder A 1323b.

In this way, the "step value=1" is added to the output value of the address counter 1325b and a result of the addition is outputted to the address counter 1325b and, then, outputted to the address decode unit 133.

While the count-up operation is performed, the adder B 1326b adds up the "start line value=1" and the "line width value=3" and outputs a result of the addition "4" to the comparator B 1327b.

The comparator B 1327b compares the addition result "4" of the adder B 1326b and the addition result of the adder A 1323b and detects that the addition result A is equal to or larger than the addition result B. The comparator B 1327b outputs a signal for notifying to that effect to the control unit 1321b. In other words, at a point when a count value of the address counter 1325b reaches "3", the addition result A of the adder A 1323b reaches "4". Consequently, since 4 is equal to or larger than the addition result B (=4), the condition "addition result A≧addition result B" is satisfied. Therefore, the comparator B 1327*b* detects that the condition is satisfied and outputs a notification signal to the control unit 1321*b*.

Since the repetition mode is set, when the notification is received, the control unit 1321*b* refers to the wait value stored in the register 11 at timing of a rising edge of a counter update clock. Since the wait value is 1, the control unit 1321*b* immediately outputs a control signal indicating that the select line address is inactive to the address decode unit 133.

Since the wait value is "1", continuously, the control unit 1321*b* controls the initial-value generating circuit 1322*b* and the selector circuit 1324*b* and sets the start line value "1" in the address counter 1325*b* at timing of a rising edge of the next counter update clock. Simultaneously with this, the control unit 1321*b* outputs a control signal indicating that the select line address is active to the address decode unit 133.

By repeating the processing described above, the address counter 1325*b* continuously repeats the count operation to output values "1, 2, 3, 4, 1, 2, 3, 4, ..." in this order. However, when the count value is "4", the control unit 1321*b* is in a wait period, in which the select line address is inactive.

Operations of address generation processing for a readout line and a reset line and reset processing and readout processing for accumulated charges with respect to a select line at the time when the "initial value addition mode" is set for the select-line-address generating circuits 132*a* to 132*d* are explained with reference to FIGS. 9 and 10.

FIGS. 9A to 9C are diagrams for explaining operations of the initial value addition mode. FIG. 9A is a diagram showing an example of a line structure of a pixel. FIG. 9B is a diagram showing an example of control data. FIG. 9C is a diagram showing an example of output values of the respective counters. FIG. 10 is a diagram showing an example of an arithmetic operation of the select-line-address generating circuit for the control data shown in FIG. 9B.

Roles of the respective select-line-address generating circuit are the same as those in the normal mode and the repetition mode described above.

As shown in FIG. 9A, active pixel lines are pixel lines with line numbers 1 to 16 and return pixel lines are pixel lines with line numbers 17 to 20. The reference counter 131 is controlled to repeatedly perform a count operation in a range of "0" to "19" at a step width "1".

First, control data is transmitted from the system controller to the image capturing device 100 and stored in the register 11 via the communication unit 10.

As shown in FIG. 9B, as the offset value of the control data, "0", "3", "10", and "19" are set (stored) for the select-line-address generating circuits 132*a* to 132*d*, respectively. As the start line value, "1" is set for the select-line-address generating circuits 132*a* to 132*d*. As the line width value, "16" is set for the select-line-address generating circuits 132*a* to 132*d*. As the step value, "4" is set for the select-line-address generating circuits 132*a* to 132*d*. As the wait value, "1" is set for the select-line-address generating circuits 132*a* to 132*d*.

When an instruction for starting an operation is received from the system controller, the respective select-line-address generating circuits 132*a* to 132*d* of the readout/reset-line-address generating unit 13 shift to the start wait state.

As shown in FIG. 9C, when the reference counter 131 (BC in the figure) starts a count operation and a count value of the reference counter 131 is set to "0", the count value coincides with the offset value "0" of the select-line-address generating circuit 132*a*. Therefore, a start line value "1" is set as an initial value in the address counter 1325*a*. Since the initial value addition mode is set and a step width of the select-line-address generating circuit 132*a* is "4", the count value is counted up in a range from the initial value "1" to the count width value (the maximum count value) "16" by 4 at a time (CLS in FIG. 9C).

When the initial value is "1", a count value of the address counter 1325*a* changes from 1 to 5, 9, and 13 in this order according to a count-up operation at the step width "4". A count-up value next to "13" is "17", which exceeds "16". Therefore, one clock of wait is inserted among respective count-up operations, "1" is added to the initial value, and the count-up operation is performed at the step width "4" again in a range from a new initial value "2" after the addition to the maximum count value "16". The count values changes from 2 to 6, 10, and 14 in this order. In this way, the reference counter 131 performs, the number of times equivalent to a value of the step width, processing for performing the count-up operation while inserting one clock of wait among the respective count-up operations and adding "1" to the present initial value (CLS in FIG. 9C). Consequently, in the count operation for the third time, the count value changes from 3 to 7, 11, and 15 in this order. In the count operation for the fourth time, the count value changes from 4 to 8, 12, and 16 in this order. In other words, the count value reaches the maximum count value "16" according to the count operation for the fourth time. When the count operation for the fourth time is finished, the present initial value "4" is changed to the first initial value "1" and the count processing and the addition processing for the initial value are executed again.

On the other hand, when the reference counter 131 counts up by 1 according to the counter update clock and the count value thereof reaches "3", "10", and "19", the count values coincide with the offset values "3", "10", and "19" of the select-line-address generating circuits 132*b*, 132*c*, and 132*d*. Therefore, a start line value "1" is set as an initial value in the address counters 1325*a* to 1325*d*. The initial value addition mode is also set for the select-line-address generating circuits 132*b* to 132*d* and the step width is "4". Therefore, operations after this are the same as those of the select-line-address generating circuit 132*a*. In other words, in the count operation for the first time, the count value changes from 1 to 5, 9, and 13 in this order, in the count operation for the second time, the count value changes from 2 to 6, 10, and 14 in this order, in the count operation for the third time, the count value changes from 3 to 7, 11, and 15 in this order, and in the count operation for the third time, the count value changes from 4 to 8, 12, and 16 in this order.

Exposure time of LOAD1 is 3H, exposure time of LOAD2 is 10H, and exposure time of LOAD3 is 19H. However, time when charges are read out is varied in a comb shape.

Figure 10:
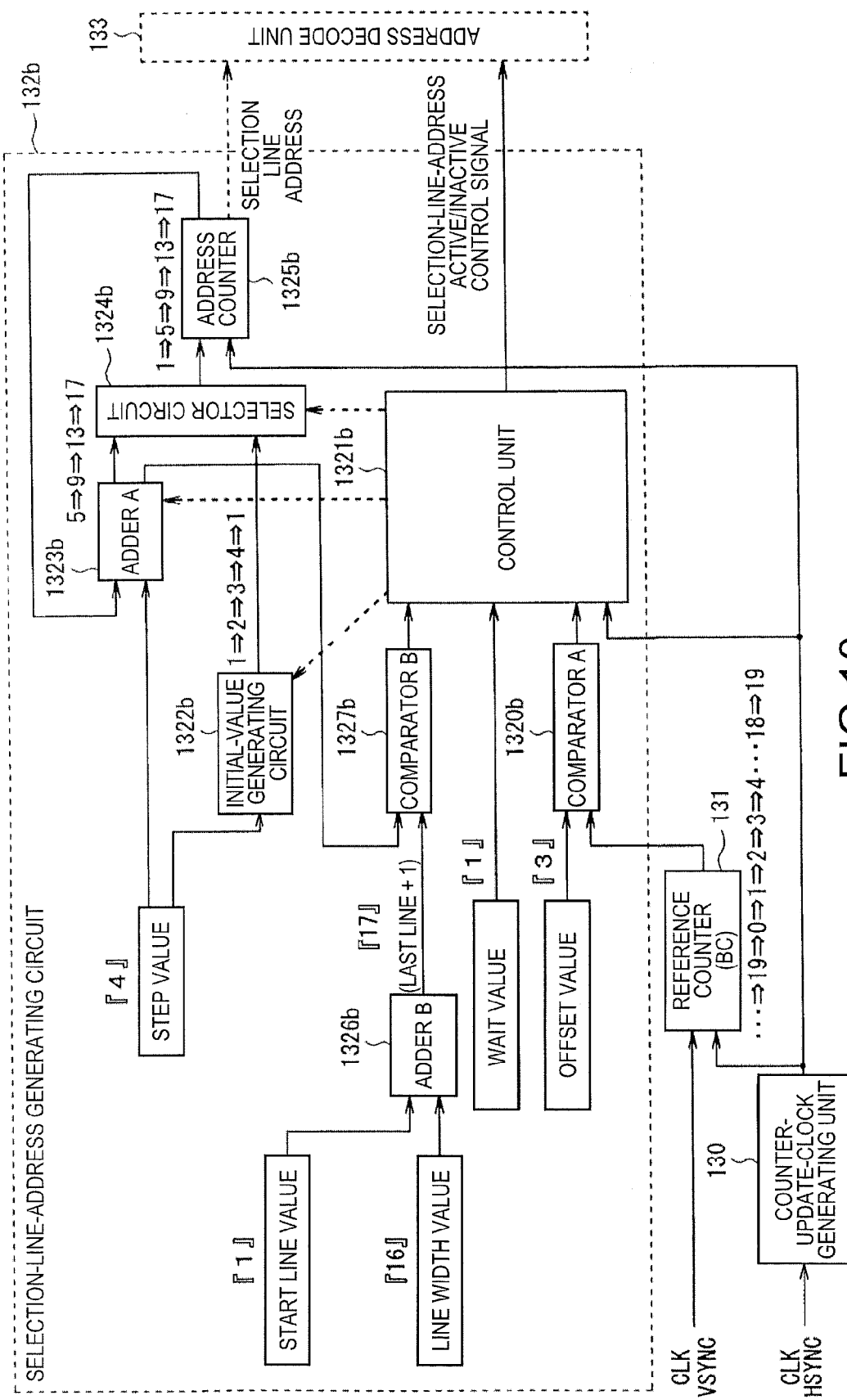
FIG. 10 is a diagram showing an example of an arithmetic operation of the select-line-address generating circuit applied to control data in FIG. 9B.

The arithmetic operations of the internal circuits are explained more specifically with reference to FIG. 10 with the select-line-address generating circuit 132*b* cited as an example.

As shown in FIG. 10, the comparator A 1320*b* compares the offset value "3" and a count value of the reference counter 131. When the count value is "3", the comparator A 1320*b* detects coincidence of the offset value and the count value and outputs a notification signal indicating that the coincidence is detected to the control unit 1321*b*.

The control unit 1321*b* is in the "start wait" state at present. Therefore, when the notification of the detection of the coincidence is received, the control unit 1321*b* shifts to the "count-up mode" and outputs a control signal indicating that the select line address is active to the address decode unit 133 at timing of a rising edge of the next counter update clock.

Moreover, the control unit 1321*b* outputs, to the initial-value generating circuit 1322*b*, an instruction signal for instructing the initial-value generating circuit 1322b to output "start line value=1" to the selector circuit 1324b. The control unit 1321b also outputs, to the selector circuit 1324b, an instruction signal for instructing the selector circuit 1324b to output an input value from the initial-value generating circuit 1322b to the address counter 1325b. Consequently, an initial value "1" is set in the address counter 1325b. This set value "1" is outputted to the address decode unit 133 and the adder A 1323b.

Furthermore, the control unit 1321b having shifted to the count-up mode outputs, to the selector circuit 1324b, an instruction signal for instructing the selector circuit 1324b to output the input value from the adder A 1323b to the address counter 1325b. On the other hand, since "1" is inputted from the address counter 1325b, the adder A 1323b adds the step value "4" to this "1" and outputs a result of the addition "5" to the selector circuit 1324b.

Therefore, "5" inputted from the adder A 1323b is outputted from the selector circuit 1324b to the address counter 1325b at timing of a rising edge of the next counter update clock. Consequently, "5" is outputted from the address counter 1325b to the address decode unit 133 and the adder A 1323b.

In this way, the "step value=4" is added to the output value of the address counter 1325b and a result of the addition is outputted to the address counter 1325b and, then, outputted to the address decode unit 133. In other words, the count value of the address counter 1325b is counted up from 1 to 5, 9, 13, and 17 in this order.

While the count-up operation is performed, the adder B 1326b adds up the "start line value=1" and the "line width value=16" and outputs a result of the addition "17" to the comparator B 1327b.

The comparator B 1327b compares the addition result "17" of the adder B 1326b and the addition result of the adder A 1323b and detects that the addition result of the adder A 1323b is equal to or larger than "17". The comparator B 1327b outputs a signal for notifying to that effect to the control unit 1321b. In other words, at a point when a count value of the address counter 1325b reaches "13", the addition result of the adder A 1323b reaches "17". Therefore, the comparator B 1327b detects that the addition result of the adder B 1326b is equal to or larger than the addition result of the adder A 1323b (17≧17) and notifies the control unit 1321b to that effect.

Since the initial value addition mode is set, when the notification is received, the control unit 1321b refers to the wait value stored in the register 11 at timing of a rising edge of a counter update clock. Since the wait value is 1, the control unit 1321b immediately outputs a control signal indicating that the select line address is inactive to the address decode unit 133. At this point, the control unit 1321b outputs an instruction signal for instructing the initial-value generating circuit 1322b to increase the initial value to the initial-value generating circuit 1322b. Therefore, the initial-value generating circuit 1322b adds "1" to the initial value "1" of the address counter 1325b in the count operation for the first time and outputs a result of the addition "2" to the selector circuit 1324b.

Since the wait value is "1", continuously, the control unit 1321b controls the selector circuit 1324b and sets the new initial value "2" in the address counter 1325b at timing of a rising edge of the next counter update clock. Simultaneously with this, the control unit 1321b outputs a control signal indicating that the select line address is active to the address decode unit 133.

Consequently, the count value of the address counter 1325b changes from 2 to 6, 10, and 14 in this order according to the count operation for the second time.

At a point when the count value "14" is outputted, an addition result of the adder A 1323b reaches "18" and the comparator B 1327b detects that the addition result of the adder B 1326b is equal to or larger than the addition result of the adder A 1323b (18≧17). Therefore, the control unit 1321b immediately outputs a control signal indicating that the select line address is inactive to the address decode unit 133.

The addition processing for the initial value is performed in the same manner as above, the initial value is "3" in the count operation for the third time, and the count value of the address counter 1325b changes from 3 to 7, 11, and 15 in this order.

Similarly, in the count operation for the fourth time, the initial value is "4" and the count value of the address counter 1325b changes from 4 to 8, 12, and 16 in this order.

In the count operation for the fourth time, at a point when the count value "16" is outputted, the addition result of the adder A 1323b changes to "20" and the comparator B 1327b detects that the addition result of the adder B 1326b is equal to or larger than the addition result of the adder A 1323b (20≧17). Therefore, the control unit 1321b immediately outputs a control signal indicating that select line address is inactive to the address decode unit 133.

When the count operation for the fourth time is finished, the number of times "4" and the step value "4" coincide with each other. Therefore, the control unit 1321b outputs, to the initial-value generating circuit 1322b, an instruction signal for instructing the initial-value generating circuit 1322b to change the present initial value "4" to the start line value "1". Consequently, the initial-value generating circuit 1322b outputs the start line value "1" to the selector circuit 1324b.

Since the wait value is "1", continuously, the control unit 1321b controls the selector circuit 1324b and sets the initial value "1" in the address counter 1325b at timing of a rising edge of the next counter update clock. Simultaneously with this, the control unit 1321b outputs a control signal indicating that the select line address is active to the address decode unit 133.

Processing same as above is applied to CLS and LOAD2 to LOAD3.

As described above, in the image capturing device 100 according to this embodiment, the select-line-address generating circuits are provided in the number equal to the number of time divisions of the readout processing and the reset processing for accumulated charges and operations of the select-line-address generating circuits can be controlled independently from one another. Therefore, it is possible to cause the image capturing device 100 to execute various kinds of readout processing, for example, cause the image capturing device 100 to quickly reads out charges from apart of the sensor cells of the sensor cell array 15, read out charges while skipping arbitrary several rows, and perform interlace readout.

Moreover, since the respective select-line-address generating circuits can be controlled independently from one another, it is possible to perform stop, setting change, and operation of only a part of the select-line-address generating circuits. Consequently, it is also possible to switch and output captured images according to a situation while continuing to output normal exposure images.

Since the address counter for the readout processing and the address counter for the reset processing can be controlled independently from each other, it is possible to accurately control readout timing and reset timing.

Output values of the plural select-line-address generating circuits (132a to 132d) are selected by the time division selector 133a in a time division manner and the selected output values are outputted to one address decode circuit 133b. Therefore, it is possible to simplify a circuit configuration.

In the embodiment, the readout/reset-line-address generating unit 13 corresponds to the address generating device described in the summary of the invention and the sensor array 15 corresponds to the photoelectric conversion unit described in the summary of the invention.

In the embodiment, the control data corresponds to the control information described in the summary of the invention, the comparator A 1320, the control unit 1321, the adder B 1326, and the comparator B 1327 correspond to the control unit described in the summary of the invention, the initial-value generating circuit 1322, the adder A 1323, the selector circuit 1324, and the address counter 1325 correspond to the address counter described in the summary of the invention, the time division selector 133a corresponds to the selection circuit described in the summary of the invention, the address decode circuit 133b corresponds to the address decode circuit described in the summary of the invention, and the reference counter 131 corresponds to the reference counter described in the summary of the invention.

As a modification of the embodiment, an image capturing device that can simultaneously perform plural kinds of reset processing in addition to the configuration for performing the readout processing and the reset processing in a time division manner in the embodiment is explained with reference to FIG. 11 and FIGS. 12A to 12C.

Figure 11:
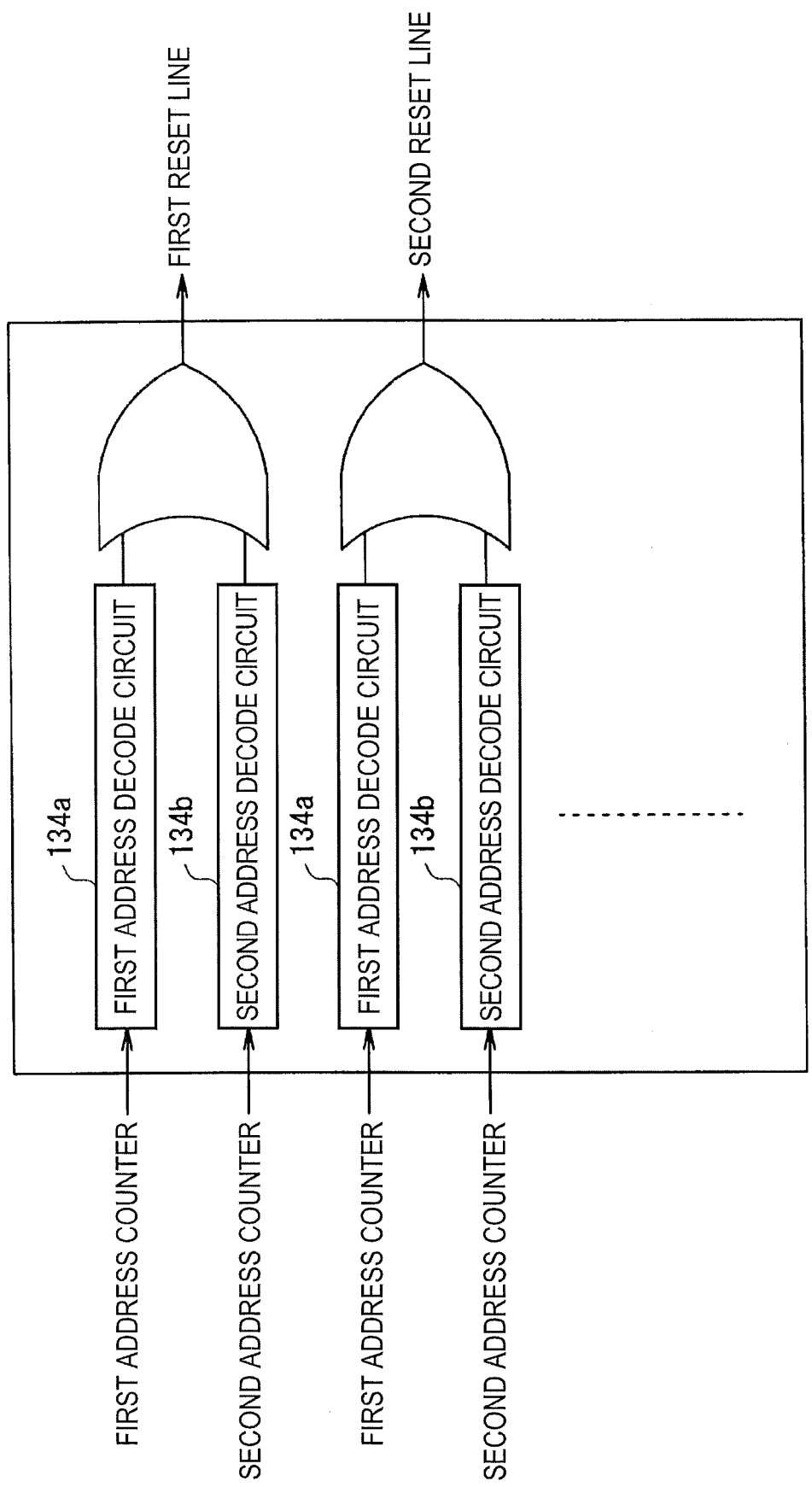
FIG. 11 is a diagram showing the structure of an address decode unit that can simultaneously reset plural lines.

FIG. 11 is a diagram showing the structure of an address decode unit that can simultaneously reset plural lines. FIGS. 12A to 12C are diagrams for explaining a select-line-address generating circuit that can simultaneously reset two lines. FIG. 12A is a diagram showing an example of the line structure of a pixel. FIG. 12B is a diagram showing an example of control data. FIG. 12C is a diagram showing an example of output values of respective counters.

The respective sensor cells are connected to the sensor cell array 15 by using a common line. Therefore, the readout processing is performed to simultaneously read out accumulated charges from the sensor cells in the plural lines, accurate pixel signal data is not obtained. On the other hand, since the reset processing is processing for emptying accumulated charges of sensor cells, it is possible to simultaneously apply the reset processing to the sensor cells of the plural lines.

However, in order to simultaneously apply the reset processing to the sensor cells of the plural lines, it is necessary to activate the plural lines at a time. On the other hand, a circuit that decodes the selection of a relevant line is selected can usually decode only one address. Therefore, in this modification, as shown in FIG. 11, a select-line-address generating circuit 132e for the reset processing is provided anew and address decode circuits 134a and 134b are provided in a number same as the number of simultaneous resets (2 in this context). An output value of the address counter 1325a (a first address counter in FIG. 11) of the select-line-address generating circuit is inputted to the first address decode circuit 134a. An output value of an address counter 1325e (a second address counter in FIG. 11) of the select-line-address generating circuit 132e is inputted to the second address decode circuit 134b. A selection signal for simultaneously activating reset lines of two selection addresses according to a logical sum of the output values of the first and second address decode circuits 134a and 134b is outputted.

Operations of the address generation processing for the readout line and the reset line and the reset processing and the readout processing for accumulated charges with respect to the select line at the time when the reset processing is simultaneously executed on two lines are explained with reference to FIGS. 12A to 12C.

The select-line-address generating circuits 132a and 132e are used as the select-line-address generating circuits for the reset processing and the select-line-address generating circuits 132b to 132d are used as the select-line-address generating circuits for the readout processing.

As shown in FIG. 12A, active pixel lines are pixel lines with line numbers 1 to 16 and return pixel lines are pixel lines with line numbers 17 to 20. Among the active pixel lines, the pixel lines with line numbers 1 to 4 are high-speed readout object pixel lines and the pixel lines with line numbers 5 to 16 are normal readout object pixel lines. The reference counter 131 is controlled to repeatedly perform a count operation in a range of "0" to "19" at a step width "1".

First, control data is transmitted from the system controller to the image capturing device 100 and stored in the register 11 via the communication unit 10.

As shown in FIG. 12B, as the offset value of the control data, "0", "2", "0", "10", and "19" are set (stored) for the select-line-address generating circuits 132a (CLS1 in the figure), 132b (LOAD1 in the figure), 132e (CLS2 in the figure), 132c (LOAD2 in the figure), and 132d (LOAD3 in the figure), respectively.

As the start line value, "1" is set for the select-line-address generating circuits 132a and 132b and "5" is set for the select-line-address generating circuits 132c to 132e.

As the line width value, "4" is set for the select-line-address generating circuits 132a and 132b and "12" is set for the select-line-address generating circuits 132c to 132e.

As the step value, "2" is set for the select-line-address generating circuits 132a and 132b and "1" is set for the select-line-address generating circuits 132c to 132e.

As the wait value, "1" is set for the select-line-address generating circuits 132a and 132b.

When an instruction for starting an operation is received from the system controller, the respective select-line-address generating circuits 132a to 132e of the readout/reset-line-address generating unit 13 shift to the start wait state.

As shown in FIG. 12C, when the reference counter 131 (BC in the figure) starts a count operation and a count value of the reference counter 131 is set to "0", the count value coincides with the offset value "0" of the select-line-address generating circuits 132a and 132e. Therefore, a start line value "1" of the select-line-address generating circuit 132a is set as an initial value in the address counter 1325a and a start line value "5" of the select-line-address generating circuit 132e is set as an initial value in the address counter 1325e.

The initial value addition mode is set and a step width "2" is set for the select-line-address generating circuit 132a. Therefore, in the select-line-address generating circuit 132a, a count value is counted up in a range from the initial value "1" to the count width value (the maximum count value) "4" by 2 at a time (CLS1 in FIG. 12C).

In other words, in the select-line-address generating circuit 132a, the count value of the address counter 1325a changes from 1 to 3 according to the count-up operation at the step width "2" from the initial value "1". A count-up value next to "3" is "5", which coincides with "initial value (1)+line width value (4)=5", one clock of wait is inserted, "1" is added to the initial value, and the count-up operation is performed again at the step width "2" in a range from a new initial value "2" after the addition to the maximum count value "4". Consequently, the next count value changes from 2 to 4 and 6 in this order. When the count operation for the second time is finished, the present initial value "2" is changed to the first initial value "1" and count processing and addition processing for the initial value same as those described above are executed again. Consequently, reset processing can be executed on the pixel lines with line numbers 1 to 4 by interlace scanning.

On the other hand, the normal mode is set and the step width "1" is set for the select-line-address generating circuit 132e. Therefore, in the select-line-address generating circuit 132e, a count value is counted up in a range from the initial value "5" to the count width value (the maximum count value) "16" by 1 at a time (CLS2 in FIG. 12C).

In other words, in the select-line-address generating circuit 132e, the count value of the address counter 1325e changes from 5 to 6, 7, . . . , 14, 15, and 16 in this order according to the count-up operation at the step width "1" from the initial value "5". A count-up value next to "16" is "17", which coincides with "initial value (5)+line width value (12)=17". Therefore, the control unit 1321 shifts to the "start wait" state and stays in the "start wait" state until an offset value and a count value of the reference counter coincide with each other next time.

In this way, when the select-line-address generating circuits 132a and 132e perform the count operation, count values thereof are outputted to the first and second address decode circuits 134a and 134b having the structure shown in FIG. 11, respectively. A selection signal for simultaneously activating pixel lines of addresses indicated by these two count values is outputted to the driving pulse generator 14. Consequently, two lines are simultaneously activated and accumulated charges of sensor cells of the activated two select lines are simultaneously reset.

Count operations of the other select-line-address generation circuits 132b to 132d are the same as the operations in the normal mode and the initial value addition mode in the embodiment. Therefore, explanation of the count operations is omitted.

As described above, in the image capturing device 100 according to this modification, the select-line-address generating circuits are provided in the number equivalent to the number of time divisions of the readout processing and the reset processing for accumulated charges and operations of the select-line-address generating circuits can be controlled independently from one another, and, more over, the address decode units are provided in the number equivalent to the number of simultaneous resets in the select-line-address generating circuits for the reset processing. Therefore, it is possible to realize, with a simple configuration, simultaneous reset processing for plural lines.

In the modification, the first address counter (the address counter 1325a) and the second address counter (the address counter 1325b) correspond to the address counter for the reset processing described in the summary of the invention and the first address decode circuit 134a and the second address decode circuit 134b correspond to the address decode circuits provided in the number same as the address counters for the reset processing described in the summary of the invention.

In the embodiment, the readout/reset-line-address generating unit 13 is configured by hardware. However, the invention is not limited to this. A circuit function and the like for controlling a counter operation of an address configured by the comparator A 1320, the control unit 1321, the adder B 1326, and the comparator B 1327 may be configured by software.

In the embodiment, the operations of the image capturing device 100 are explained concerning only the normal mode, the repetition mode, the initial value addition mode, and the simultaneous reset processing. However, the operations of the image capturing device 100 are not limited to these operations. Depending on a method of control, it is also possible to cause the image capturing device 100 to perform other various operations.

The entire disclosure of Japanese Patent Application No. 2007-132649 filed on May 18, 2007 is expressly incorporated by reference herein.

What is claimed is:

1. An address generator that generates, in an image capturing device including a photoelectric conversion unit having arrayed therein in a matrix plural photoelectric conversion elements that convert received light into charges and accumulate the charges and a rolling shutter function, an address indicating a line position of each of the photoelectric conversion elements that are processing objects of readout processing and reset processing for accumulated charges, the address generator comprising:
   address counters provided at least in a number same as a number of time divisions of the readout processing and the reset processing;
   a control unit that independently controls an operation of each of the address counters;
   a selecting circuit that sequentially selects each of the address counters in a time division manner and outputs a count value of the selected address counter to an address decode circuit as the address; and
   the address decode circuit that outputs a signal for changing the photoelectric conversion element in a line position corresponding to the address inputted from the election circuit in a time division manner to an active state.

2. The address generator according to claim 1, further comprising a control-information acquiring unit that acquires control information for controlling each of the address counters, wherein
   the control unit controls the address counters independently from one another on the basis of the control information acquired by the control-information acquiring unit.

3. The address generator according to claim 2, wherein
   the image capturing device performs the readout processing and the reset processing in each of the horizontal periods in a time division manner,
   the address generator includes a reference counter that performs a count operation on the basis of a counter update clock generated on the basis of a horizontal synchronization signal,
   the control information includes an offset value of each of the address counters, and
   the control unit causes, when the offset value and a count value of the reference counter coincide with each other, each of the address counters to start a count operation with timing of the coincidence as a trigger.

4. The address generator according to claim 2, wherein
   the control information includes a step value of each of the address counters, and
   the control unit sets a step width at the time of the count operation of each of the address counters and causes each of the address counters to perform counting at the set step width.

5. The address generator according to claim 2, wherein
   the control information includes a start line value of each of the address counters, and
   the control unit sets an initial value of each of the address counters on the basis of the start line value and causes each of the address counters to start counting from the set initial value.

6. The address generator according to claim 5, wherein
the control information includes a line width value of each of the address counters, and
the control unit sets a maximum count value of each of the address counters on the basis of the line width value and causes each of the address counters to perform a count operation within a range from the set initial value to the set maximum count value.

7. The address generator according to claim 2, wherein
the control information includes a step value, a start line value, and the line width value of each of the address counters, and
the control unit sets a step width at the time of a count operation of each of the address counters on the basis of the step value, causes each of the address counters to perform counting at the set step width, sets an initial value of each of the address counters on the basis of the start line value, causes each of the address counters to start counting from the set initial value, sets a maximum count value of each of the address counters on the basis of the line width value, and causes each of the address counter to perform a count operation within a range from the set initial value to the set maximum count value.

8. The address generator according to claim 7, wherein
an initial value addition mode is set for causing the address counter to continuously and repeatedly perform the count operation while increasing the initial value by 1 when the set step width is equal to or larger than "2", and
the control unit causes the address counter, for which the initial value addition mode is set, to repeatedly perform the count operation at the set step width in a range in which the count value does not exceed the maximum count value, adds 1 to the set initial value of the address counter every time the count operation is finished, and resets the initial value to the value before the addition when a value of the number of times of repetition of the count operation reaches a value same as the step width.

9. The address generator according to claim 6, wherein
a repetition mode is set for casing the address counter to continuously and repeatedly perform a count operation performed within the range of the initial value to the maximum count value, and
the control unit causes the address counter, for which the repetition mode is set, to continuously and repeatedly perform a count operation performed within a range from the set initial value to the set maximum count value.

10. The address generator according to claim 9, wherein
the control information includes a wait value of each of the address counters, and
the control unit sets a wait count number, which is a count number for a wait of each of the address counters, on the basis of the wait value, causes, every time an operation in each time of the count operation repeatedly performed is finished in the address counter for which the repletion mode is set, the address counter to count the set wait count number, and outputs a signal for inactivating the count value to the address decode circuit while the address counter is counting the wait count number.

11. The address generator according to claim 1, wherein
a plurality of address decode circuits are provided in a number same as that of plural address counters that generate addresses of line positions of the photoelectric conversion elements subjected to the reset processing, and
a signal for simultaneously changing the addresses of the line positions of the plural reset processing objects to an active state on the basis of output signals of the plural address decode circuits is outputted.

12. An image capturing device including a photoelectric conversion unit having arrayed therein in a matrix plural photoelectric conversion elements that convert received light into charges and accumulate the charges and a rolling shutter function, the image capturing device comprising:
the address generator according to claim 1;
a readout unit that nondestructively reads out the accumulated charges from the photoelectric conversion elements as the readout processing objects changed to the active state by the signal outputted from the address decode circuit; and
a reset unit that resets the accumulated charges of the photoelectric conversion elements as the reset processing objects changed to the active state by the signal outputted from the address decode circuit.

* * * * *